(12) United States Patent
Horng

(10) Patent No.: US 6,285,108 B1
(45) Date of Patent: Sep. 4, 2001

(54) BRUSHLESS DC MOTOR

(75) Inventor: Alex Horng, Kaohsiung (TW)

(73) Assignee: Sunonwealth Electric Machine Industry Co., Ltd., Kaoshiung (TW)

( * ) Notice: Subject to any disclaimer, the term of this patent is extended or adjusted under 35 U.S.C. 154(b) by 0 days.

(21) Appl. No.: 09/389,018

(22) Filed: Sep. 2, 1999

(30) Foreign Application Priority Data

Mar. 16, 1999 (TW) .................................. 88104105

(51) Int. Cl.[7] .............. H02K 7/00; H02K 1/00; H02K 1/18
(52) U.S. Cl. ............ 310/259; 310/67 R; 310/194; 310/218
(58) Field of Search ................. 310/254, 258, 310/259, 43, 194, 208, 257, 40 MM, 49 A, 49 R, 217, 218, 164, 162, 42, 179, 180, 67 R; 415/177

(56) References Cited

U.S. PATENT DOCUMENTS

| | | | |
|---|---|---|---|
| 3,551,711 | * 12/1970 | Davis | 310/43 |
| 4,891,567 | 1/1990 | Fujitami et al. | 318/254 |
| 5,409,352 | * 4/1995 | Lin | 415/177 |
| 5,679,997 | * 10/1997 | Matsuzawa et al. | 310/254 |
| 5,917,262 | * 6/1999 | Huang et al. | 310/254 |

FOREIGN PATENT DOCUMENTS

0503123A1 * 9/1992 (EP).

* cited by examiner

Primary Examiner—Nestor Ramirez
Assistant Examiner—Guillermo Perez
(74) Attorney, Agent, or Firm—Bacon & Thomas

(57) ABSTRACT

A stator includes a magnetically conductive tube with a pole plate at one end. The edge of the pole plate functions as a magnetic pole. The other end of the magnetically conductive tube is combined with another pole plate. A coil is wound between the two pole plates. The edges of both pole plates extend in opposite directions to form a larger magnet pole area.

108 Claims, 18 Drawing Sheets

BRUSHLESS DC MOTOR

BACKGROUND OF THE INVENTION

1. Field of the Invention

The present invention relates to a brushless DC motor to the structure of the stator of a brushless DC motor, the stator including a magnetic conductive tube and a pole plate.

2. Description of the Related Art

Referring to FIG. 1, a conventional brushless DC motor and stator comprises a metal tube 91 with outer surface surrounded by a coil 92, an upper pole plate 93, a lower pole plate 94 and a circuit board 95. The upper plate 93 and the lower plate 94 are formed by a plurality of stacked silicon steel plates so as to increase the area adjacent to the permanent magnet of the rotor. Because it consists of a plurality of silicon steel plates the conventional motor and stator are complex, the cost of manufacture is high, and much more of the material.

Furthermore, one end of the metal tube 91 has an annular flange 911 which is larger than the diameter of the tube. When the other end of metal tube 91 being fixed, the annular flange 911 limits the coil 92, the upper plate 93, the lower plate 94 and the circuit board 95, and thus the thickness of annular flange 911 increases the thickness of the stator. In order to decrease the thickness of the stator, the annular flange 911 may be removed for the best design.

Furthermore, U.S. Pat. No. 4,891,567, issued on Jan. 2, 1990 to Fujitani et al., discloses a pole plate having a pole which is bent in a right angle to the pole plate. The poles are bent toward each other, so that the poles cover the outer peripheral space of the coil seat. Thus, the pole plates are pressed and combined on the stator, after coils have been wounded on the coil seat of the stator. However, the poles of the stator are arranged to face each other because the coils must first be wounded on the coil seat of the stator, and then the pole plates pressed on the bobbin to form the stator. The pressing process of pole plates into a bobbin with a wound has the disadvantage that the coil wire may be cut or cut broken, the bobbin pressed, and the enameled layer of wires damaged. Wires of the coil suffer from starting current pulses in the long term resulting in the degrading of the coil assembly and resulting in deterioration of rotation of the motor and shortening motor life.

SUMMARY OF THE INVENTION

The primary object of this invention is to provide a stator of a brushless DC motor comprising a magnetic conductive tube, which has a pole plate on one end of the tube so as to reduce the thickness of the stator.

The secondary object of this invention is to provide a stator of a brushless DC motor comprising a magnetic conductive tube, which has a pole plate on one end of the tube, and another pole plate sleeved on the other end of the tube. At least one of the two pole plates has poles which extend in opposite directions to the poles of the other pole plate to form a larger conductive area of the pole plate so as to increase the torque of motor, and to permit freedom of design in accordance with the requirements of the motor without the limitation of space.

The third object of this invention is to provide a stator of a brushless DC motor comprising a magnetic conductive tube, which has a pole plate on one end of the tube, and another pole plate sleeved on the other end of the tube. At least one of the two pole plates has poles which extend in an opposite direction to those of the other pole plate to form a larger conductive area of the pole plate so as to reduce the thickness of pole plate, manufacture processes and the material cost of the pole plate.

The fourth object of this invention is to provide a stator of a brushless DC motor comprising a magnetic conductive tube whose outer surface may wind a coil or support a bobbin for a coil to simplify production processes and reduce the cost of manufacture.

The fifth object of this invention is to provide a stator of a brushless DC motor which has a thinner thickness that uses lesser material and reduces the processes of manufacture, in order to reduce the material and the manufacturing cost.

The sixth object of this invention is to provide a stator with a heat dissipating device which has a thinner thickness that uses lesser material and reduces the processes of manufacture, in order to reduce the material and the manufacturing cost.

In accordance with the present invention, a brushless DC motor comprises a magnetic conductive tube, which has a pole plate on one end of the tube and wound coils on the outer surface of the tube, and another pole plate is sleeved on the other end of the tube. The edge of both pole plates have poles extending in opposite directions to form a larger pole edge area to increase magnetic inductive area.

Other objects, advantages and novel features of the invention will become more apparent from the following detailed description when taken in conjunction with the accompanying drawings.

BRIEF DESCRIPTION OF THE DRAWINGS

The present invention will now be described in detail with reference to the accompanying drawings wherein.

DETAILED DESCRIPTION OF THE INVENTION

Figure 1:
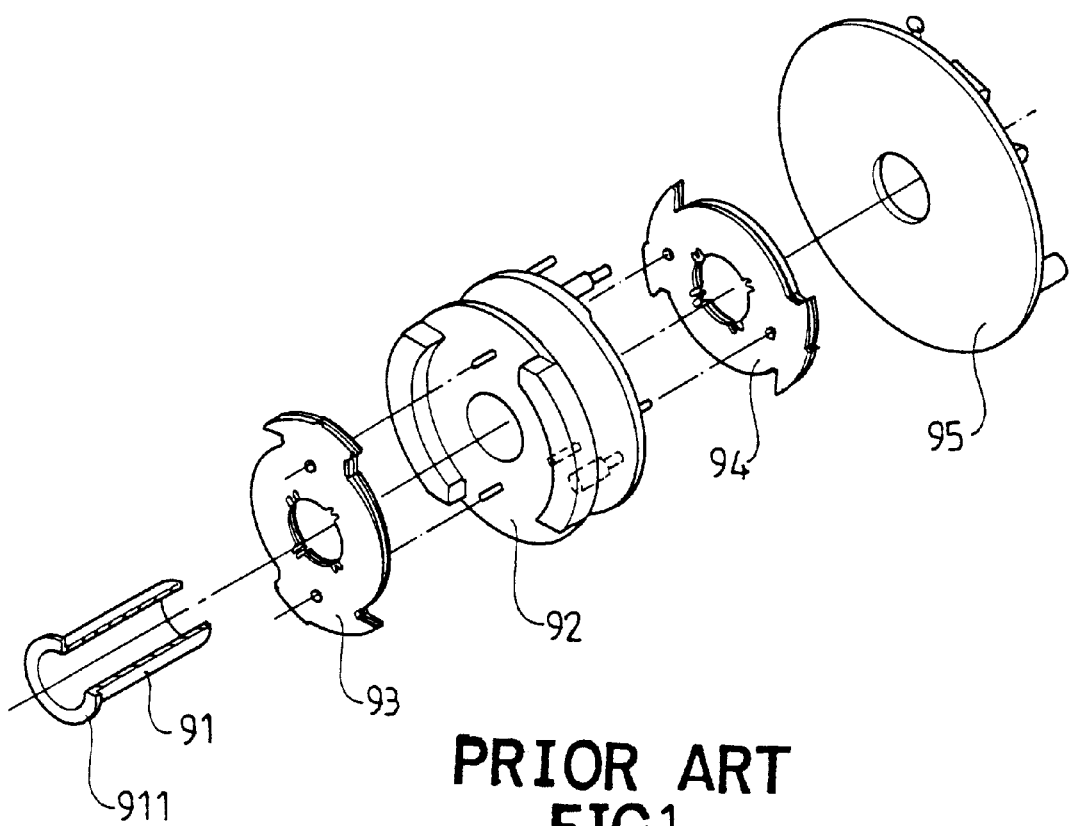
FIG. 1 is a perspective exploded view of a conventional brushless DC motor.
Figure 2:
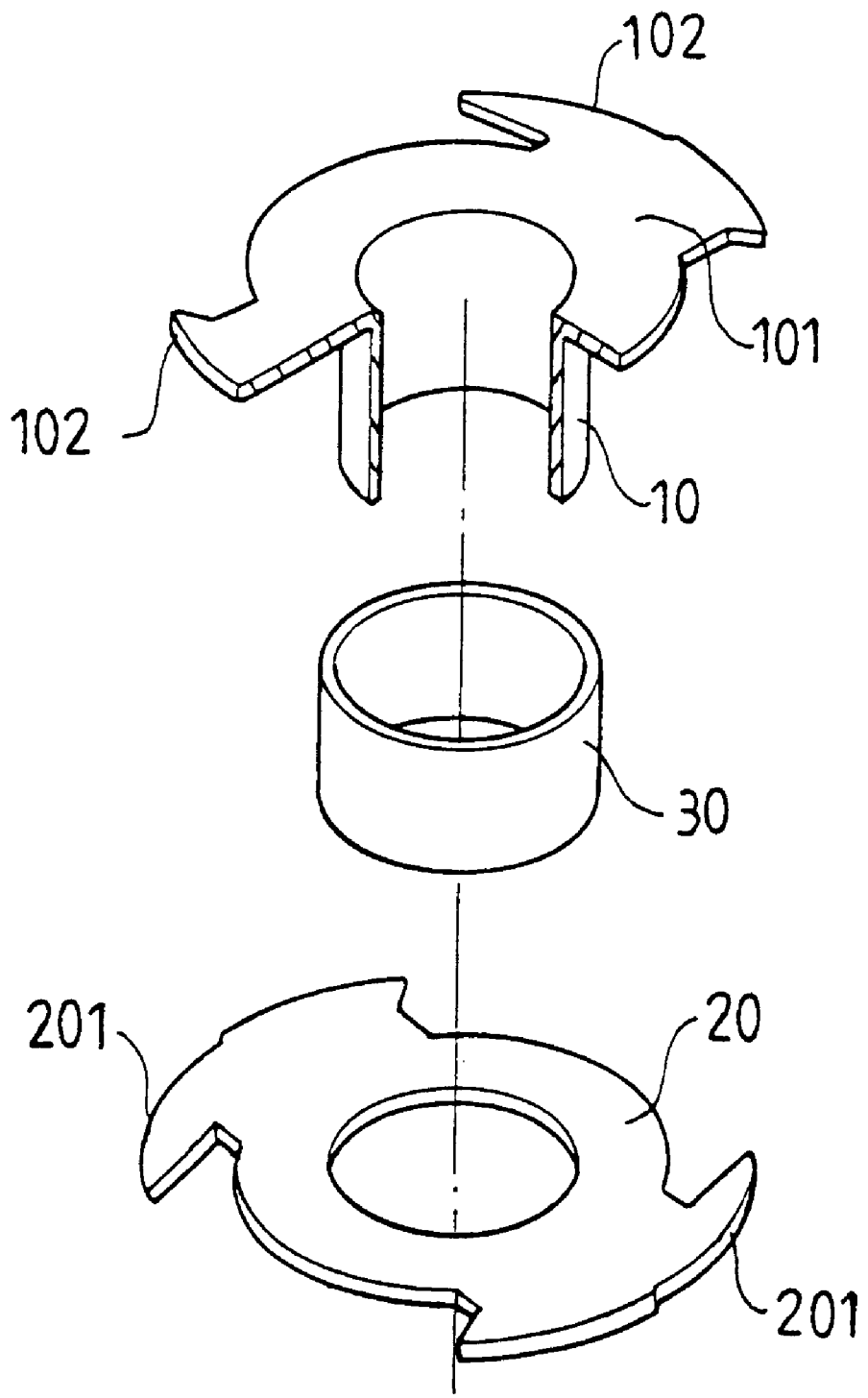
FIG. 2 is an exploded perspective view of a brushless DC motor in accordance with the first embodiment of the present invention.

Referring to FIG. 2, a brushless DC motor in accordance with the first embodiment of the present invention comprises a magnetic conductive tube 10, a pole plate 20 and a bobbin 30.

The magnetic conductive tube 10 is made of magnetizable material, forming a pole plate 101 on one end of the tube 10, so that the tube 10 and the pole plate 101 together form a body. The plate 101 forms poles 102. An inner periphery of the magnetic conductive tube 10 is provided to contain a bearing (not shown) therein for extending through a shaft of the rotor, and an outer periphery is provided to sleeve the pole plate 20 and the bobbin 30 thereon.

The pole plate 20 sleeved on the outer periphery of the magnetic conductive tube 10 has poles 201 which interact with a permanent magnet of a rotor (not shown) so as to rotate the motor smoothly, and the number of the poles 201 are provided in accordance with the design requirement of motor's pole number.

Figure 4:
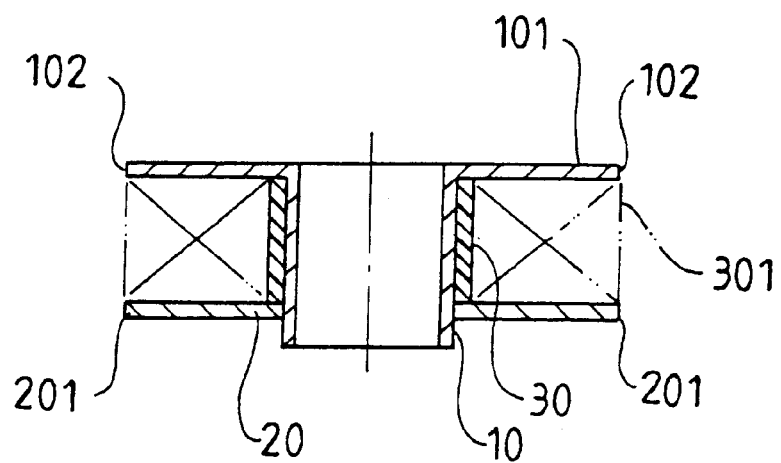
FIG. 4 is a sectional view, along line 4—4, of the brushless DC motor in accordance with a first embodiment of the present invention.

The bobbin 30 is essentially made of insulation material such as plastic, and sleeved on the outer periphery of the magnetic conductive tube 10. The bobbin 30 sleeves tightly or loosely with the outer periphery of the magnetic conductive tube 10 according to design requirements. The bobbin 30 is positioned between the pole plate 101 and the pole plate 20, and coil 301 is wound on the bobbin 30, as shown in FIG. 4. It is easy and convenient to wind the coil 301 on the bobbin 30, before or after the magnetic conductive tube 10 and the bobbin 30 are assembled. Either way may achieve the goal of easy assembly.

Figure 3:
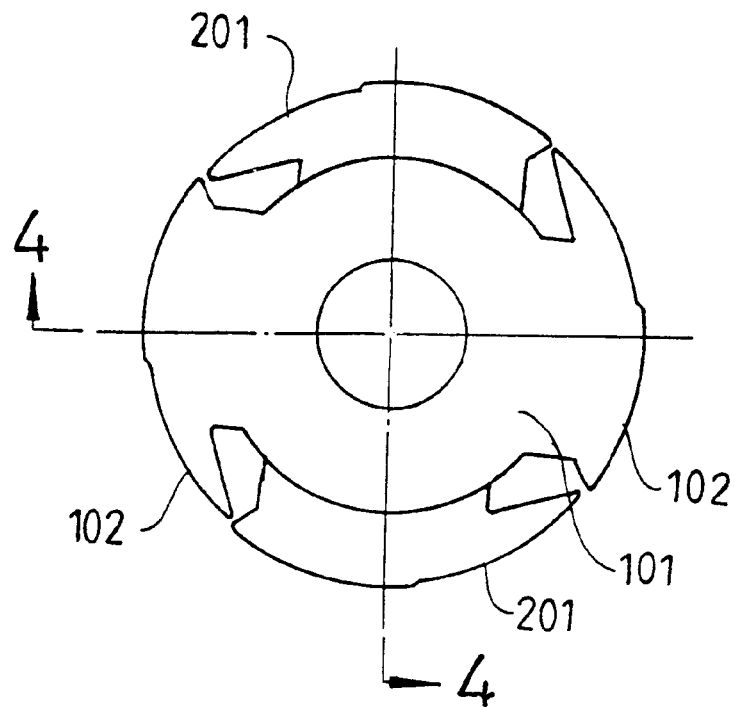
FIG. 3 is a top view of the brushless DC motor in accordance with the first embodiment of the present invention.

Referring to FIGS. 3 and 4, which show the situation of the combination of the first embodiment of the present invention. The bobbin 30 is held between the pole plate 101 and the pole plate 20, and coil 301 is wound on the outer peripheral of bobbin 30. Insulation layer is needed between coil 301, pole plate 101 and the pole plate 20, to thus forms a stator.

Figure 5:
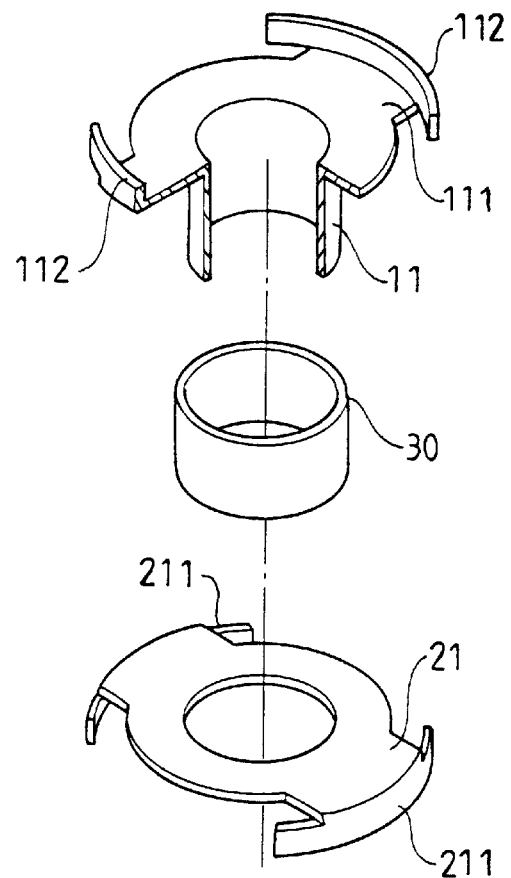
FIG. 5 is an exploded perspective view of a brushless DC motor in accordance with the second embodiment of the present invention.

Referring to FIG. 5, a brushless DC motor in accordance with the second embodiment of the present invention comprises a magnetic conductive tube 11, a pole plate 21 and a bobbin 30.

The magnetic conductive tube 11 is made of magnetizable material forming a pole plate 111 on one end, the pole plate 111 having poles 112, the outer edge of the poles 112 extending to the opposite direction of the other pole plate 21 so as to increase the induction area of stator to the permanent magnet of a rotor, so that with the thickness of a single plate, the pole plate 111 has a larger induction area The number of poles 112 are provided in accordance with the design requirement of the motor's pole number. An inner periphery of the magnetic conductive tube 11 is provided to contain a bearing (not shown) therein for extending through a shaft of the rotor, and an outer periphery is provided to sleeve the pole plate 21 and the bobbin 30 thereon.

The pole plate 21 is sleeved on the outer periphery of the magnetic conductive tube 11, the pole plate 21 having poles 211, and the outer edge of the poles 211 extending in an opposite direction to those of the pole plate 11 so as to increase the induction area of stator to the permanent magnet of a rotor, so that the thickness of a single plate of the pole plate 111 has a larger induction area. The number of poles 112 are provided in accordance with the design requirement of the motor's pole number.

The bobbin 30 is the same as in the first embodiment, and sleeved the outer peripheral of the magnetic conductive tube 10. The bobbin 30 sleeves tightly or loosely around the outer periphery of the magnetic conductive tube 10, the bobbin 30 is positioned between the pole plate 111 and the pole plate 21 therebetween. It is easy and convenient to wind coils on the bobbin 30 before or after the magnetic conductive tube 10 and the bobbin 30 are assembled. Either way may achieve the goal of easy manufacturing.

Figure 6:
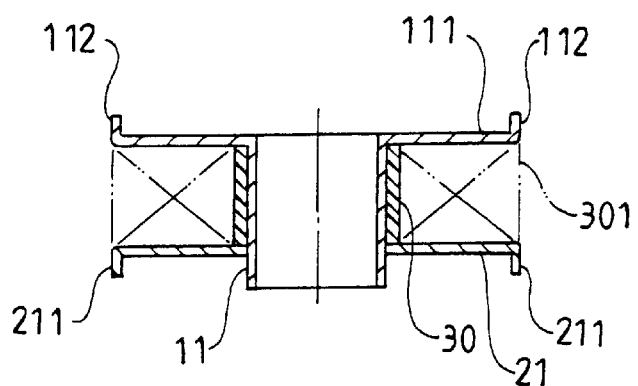
FIG. 6 is a sectional view of the brushless DC motor in accordance with the second embodiment of the present invention.

FIG. 6, shows the situation of the combination of the second embodiment of the present invention. The bobbin 30 is held between the pole plate 111 and the pole plate 21, and coil 301 is wound on the outer peripheral of bobbin 30. An insulated layer is provided between the coil 301, the pole plate 111 and the pole plate 21, and thus it forms a stator.

Figure 7:
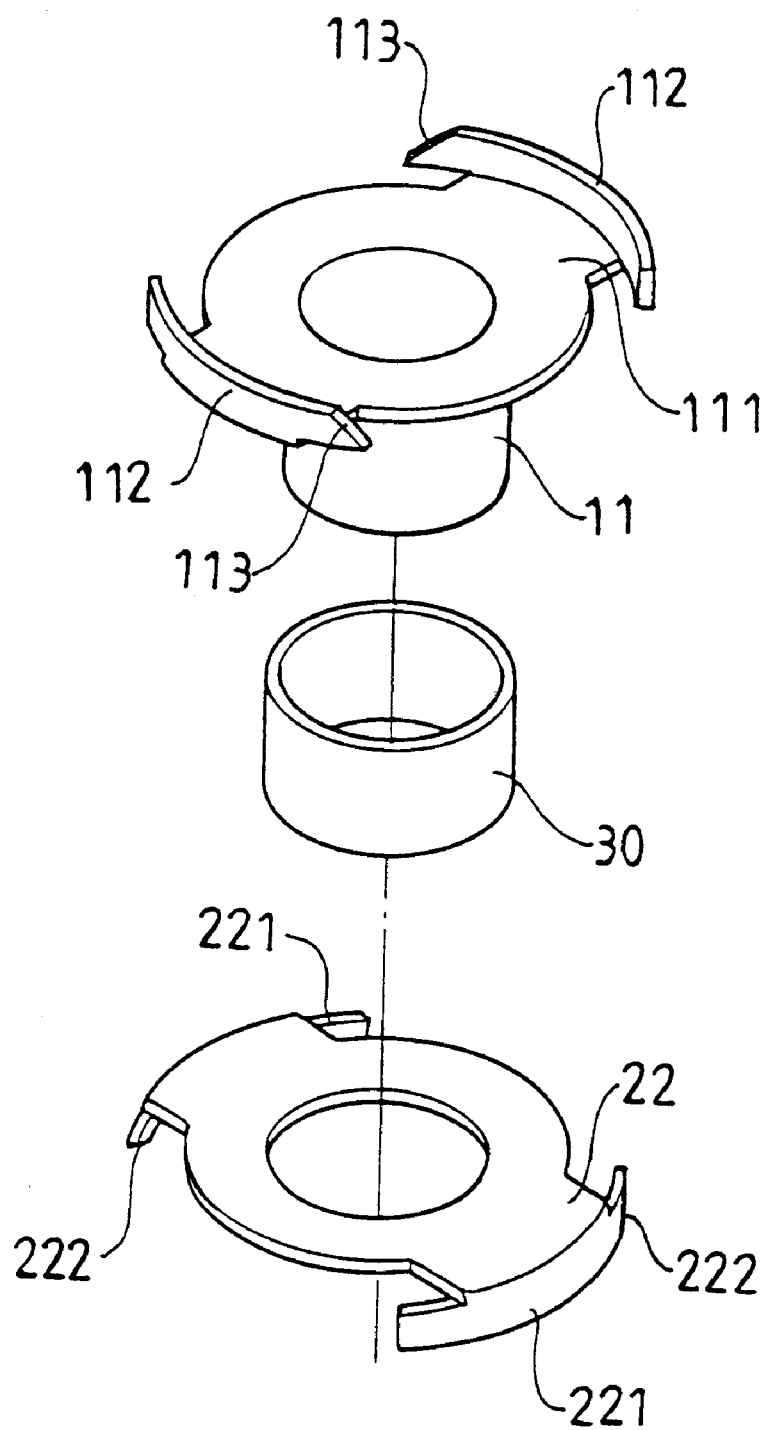
FIG. 7 is an exploded perspective view of a brushless DC motor in accordance with a third embodiment of the present invention.

Referring to FIG. 7, a brushless DC motor in accordance with the third embodiment of the present invention comprises a magnetic conductive tube 11, a pole plate 22 and a bobbin 30 corresponding to the second embodiment. The third embodiment further comprises an inclined portion 113, 222 respectively formed on the poles 112, 221, which, unlike the second embodiment, form an irregular magnetic field. Because of the irregular magnetic field, the stator drives the rotor easily at the beginning of the motor start-up.

Figure 8:
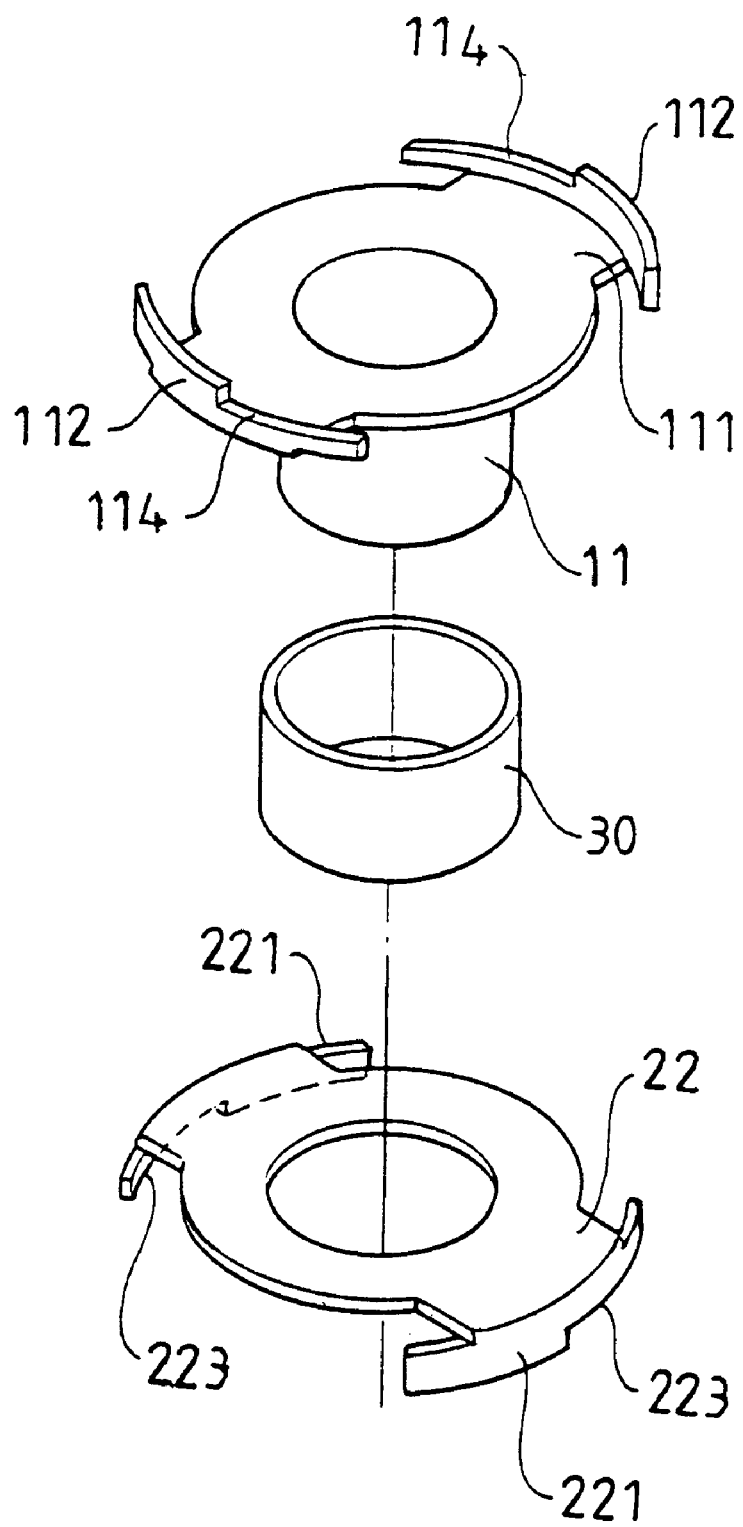
FIG. 8 is an exploded perspective view of a brushless DC motor in accordance with a third embodiment of the present invention.
Figure 9:
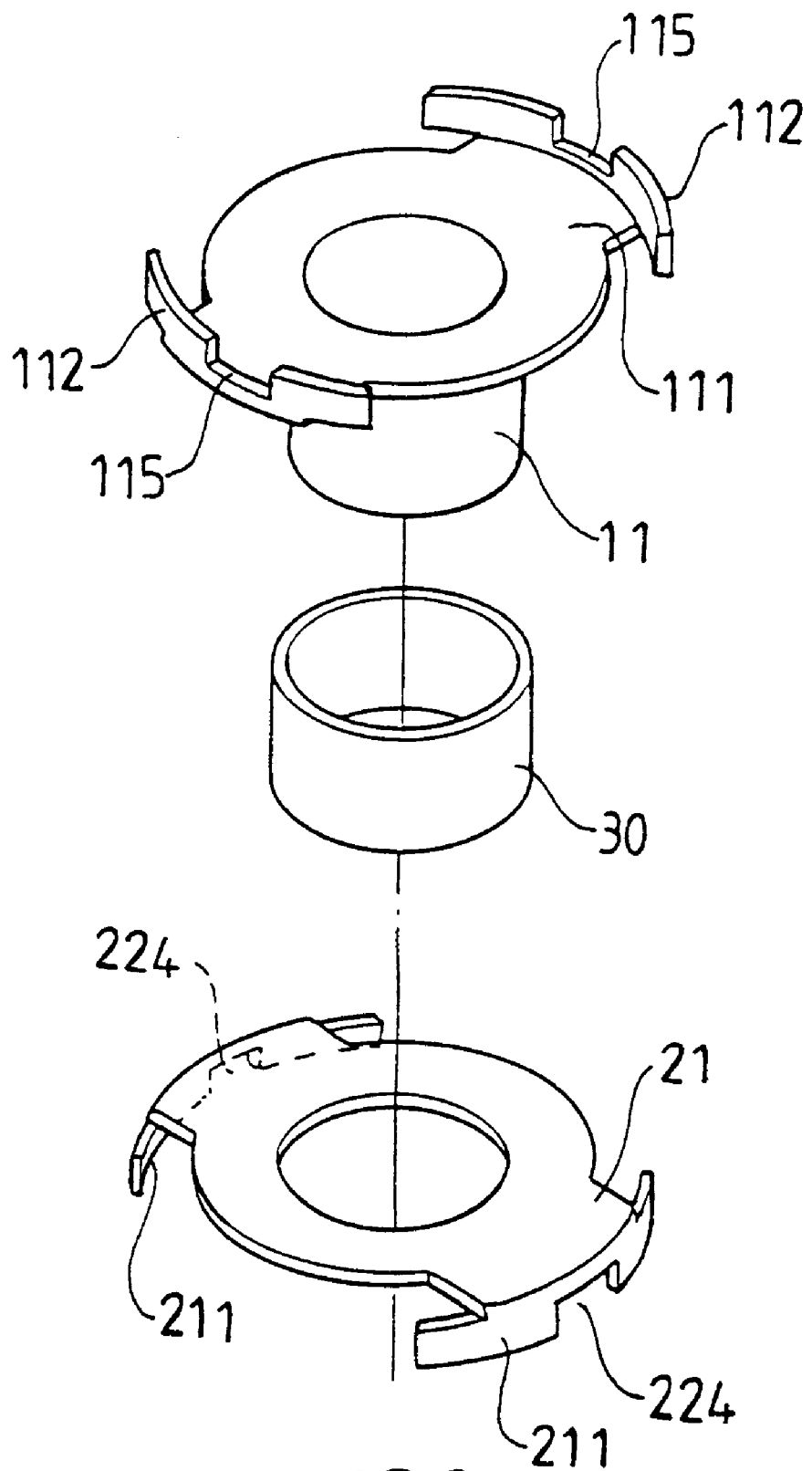
FIG. 9 is an exploded perspective view of a brushless DC motor in accordance with a third embodiment of the present invention.

Referring to FIG. 8, the third embodiment of the present invention further comprises a magnetic conductive tube 11, a pole plate 22 and a bobbin 30. The third embodiment further comprises a lower portion 114, 223 instead of the inclined portion 113, 222 respectively formed on the poles 112, 221 to form an irregular magnetic field. And, the third embodiment further comprises a recessed portion 115, 224 respectively formed on the poles 112, 221 to form an irregular magnetic field, as shown in FIG. 9. Because of the irregular magnetic field, the stator drives the rotor easily at the beginning of the motor start-up.

Figure 10:
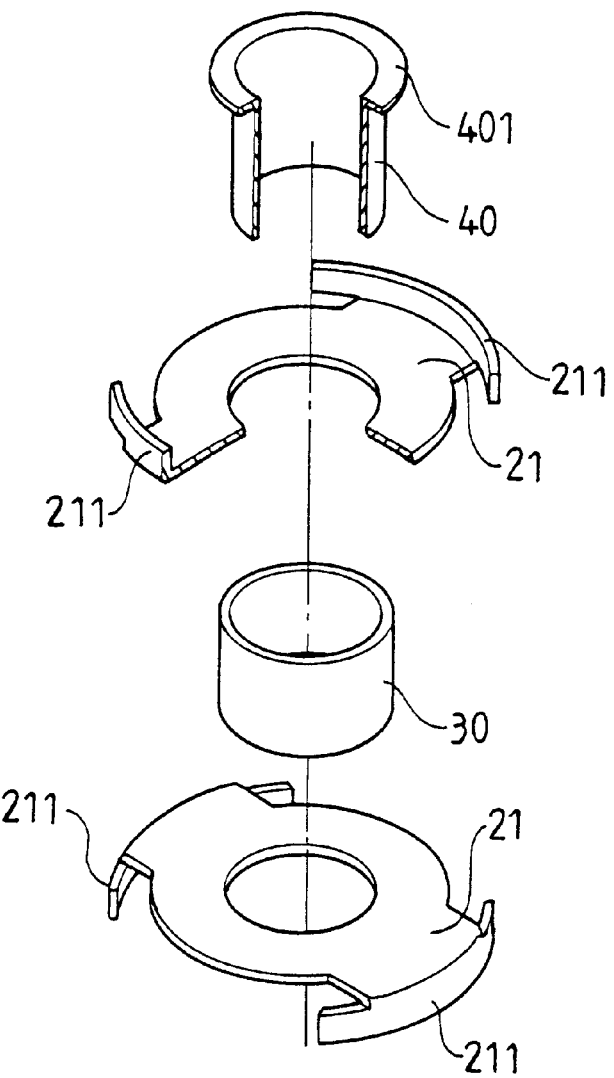
FIG. 10 is an exploded perspective view of a brushless DC motor in accordance with a fourth embodiment of the present invention.

Referring to FIG. 10, a brushless DC motor in accordance with the fourth embodiment of the present invention comprises two pole plates 21, a bobbin 30 and a magnetic conductive tube 40.

The magnetic conductive tube 40 is made of magnetizable material, forming an annular flange 401 on one end so as to hold the pole plate 21 in place. An inner periphery of the magnetic conductive tube 40 is provided with a bearing (not shown) therein for extending through a shaft of the rotor, and an outer surface to sleeve the two pole plates 21 and the bobbin 30 thereon.

The number of pole plates 21 is more than two, the plates being sleeved on the outer surface of the magnetic conductive tube 40 to be held in place by the annular flange 401. The pole plate 21 has poles 211, the outer edge of the poles 211 extending in the opposite direction to those of the pole plate 11 so as to increase the induction area of the stator to relative to the permanent magnet of a rotor, so that the thickness of a single plate of the pole plate 111 has a larger induction area. The number of poles 112 are provided in accordance with the design requirement of the motor's pole number.

The bobbin 30 is essentially made of insulation material such as plastic, and was sleeved to the outer peripheral of the magnetic conductive tube 10. The bobbin 30 sleeves tightly or loosely on the outer surface of the magnetic conductive tube 10. The bobbin 30 is positioned between the pole plate 101 and the pole plate 20 therebetween and wire are coiled on the bobbin 30 thereon to form a coil 301. It is easy and convenient to wind the coil 301 on the bobbin 30 before or after the magnetic conductive tube 10 and the bobbin 30 are assembled. Either way may achieve the goal of easy assembly.

Figure 11:
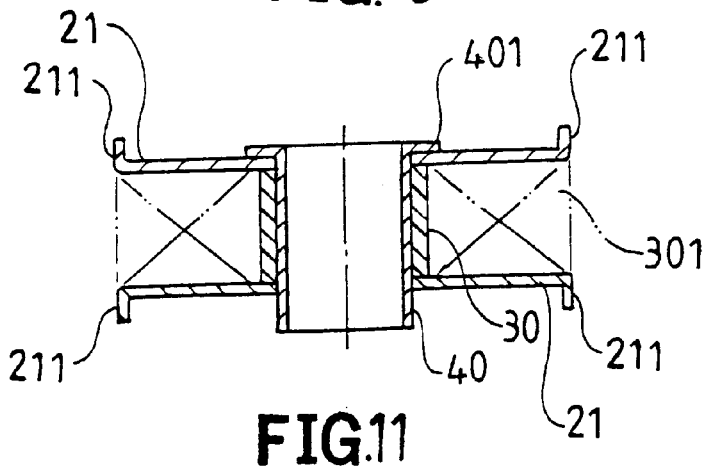
FIG. 11 is a sectional view of the brushless DC motor in accordance with the fourth embodiment of the present invention.

FIG. 11 that shows the situation of the combination of the fourth embodiment of the present invention. The bobbin 30 is held between the two pole plates 21, and the coil 301 wound on the outer surface of bobbin 30. An insulated layer is provided between the coil 301 and the two pole plates 21, to thus form a stator.

Figure 12:
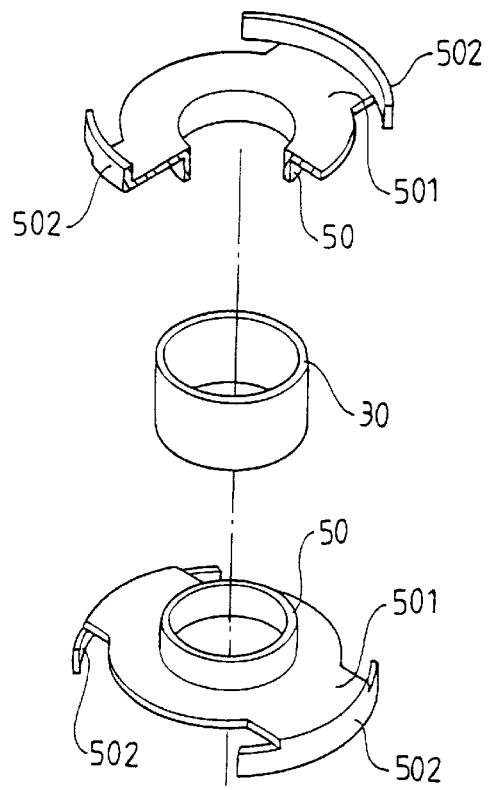
FIG. 12 is an exploded perspective view of a brushless DC motor in accordance with a fifth embodiment of the present invention.

Referring to FIG. 12, a brushless DC motor in accordance with the fifth embodiment of the present invention comprises a bobbin 30 and two magnetic conductive tubes 50.

The magnetic conductive tube 50 is made of magnetizable material forming a pole plate 501 on one end, the pole plate 501 having poles 502, the outer edge of the poles 502 extending to an opposite direction relative to those of the other pole plate 501 so as to increase the induction area of the stator relative to the permanent magnet of a rotor, so that with the thickness of a single plate, the pole plate 501 has a larger induction area. The number of poles 502 are provided in accordance with the design requirement of the motor's pole number. The magnetic conductive tubes 50 are attached to each other and form an inner peripheral which is provided to contain a bearing (not shown) therein for extending through a shaft of the rotor, and an outer surface is provided to sleeve the pole plate 21 and the bobbin 30 thereon.

The bobbin 30 is essentially made of insulation material such as plastic, and was sleeved to the outer surface of the magnetic conductive tube 50. The bobbin 30 is sleeved tightly or loosely on the outer surface of the two attached magnetic conductive tube 50. The bobbin 30 is positioned between the two pole plates 501 therebetween. Coil 301 is wound on the bobbin 30. It is easy and convenient to wind the coil 301 on the bobbin 30 before or after the magnetic conductive tube 50 and the bobbin 30 are assembled. Either way may achieve the goal of easy assembly.

Figures 13, 14:
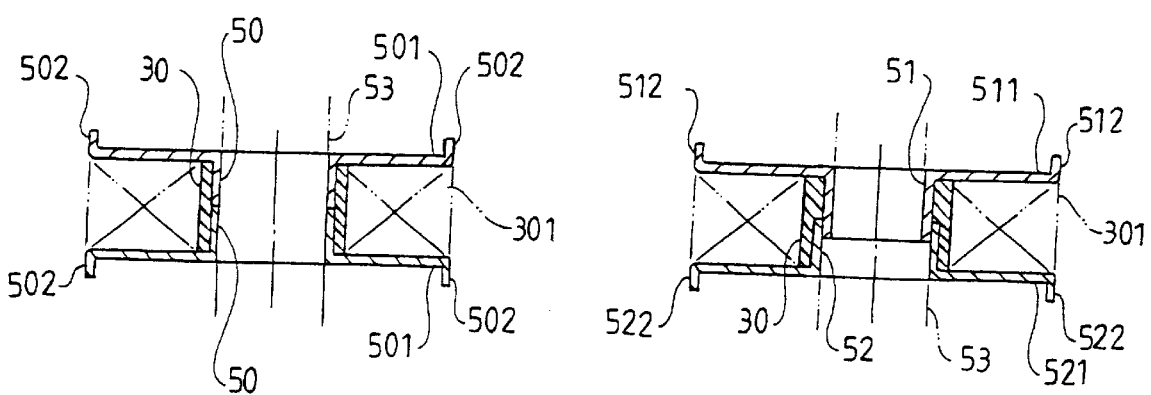
FIG. 13 is a sectional view of the brushless DC motor in accordance with the fifth embodiment of the present invention.
FIG. 14 is a sectional view of the brushless DC motor in accordance with the fifth embodiment of the present invention.

FIG. 13 that shows the situation of the combination of the fifth embodiment of the present invention. The bobbin 30 is sleeved to the outer surface of the two attached magnetic conductive tubes 50, and coil 301 is wound on the outer surface of bobbin 30. An insulated layer is provided between the coil 301 and the pole plates 501), thus forming a stator to be fixed onto a supporter 53.

Referring to FIG. 14, the further modification of the fifth embodiment comprises two magnetic conductive tubes 51 and 52 having different diameter. The magnetic conductive tube 51 has a smaller diameter than the magnetic conductive tube 52 such that the outer surface of the magnetic conductive tube 51 is held in the inner surface of the magnetic conductive tube 52. The bobbin 30 is sleeved to the outer surface of the magnetic conductive tube with the large diameter. The coil 301 is wound on the outer surface of bobbin 30 and insulated layer is provided between the coil 301 and the pole plates 511, thus forming a stator to be fixed on to a supporter 53 by the magnetic conductive tube with the smaller diameter.

Figure 15:
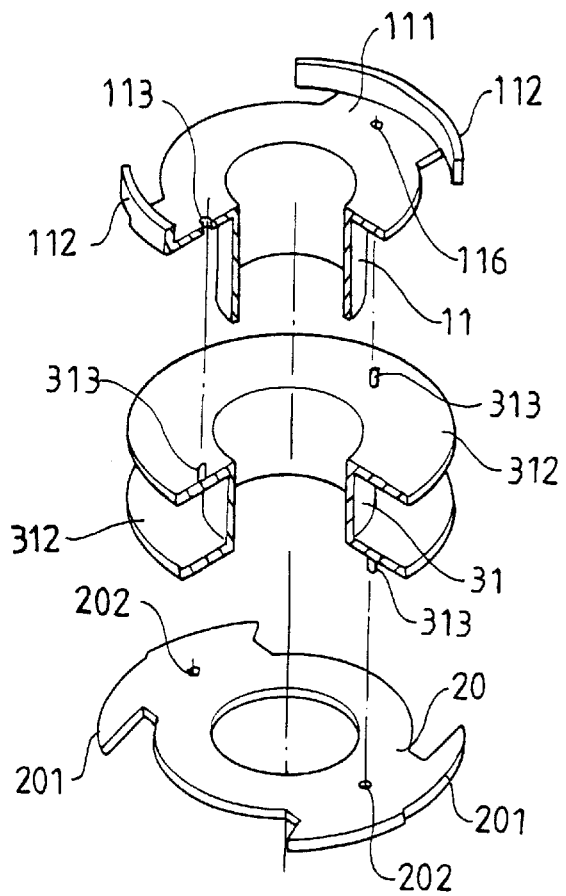
FIG. 15 is an exploded perspective view of a brushless DC motor in accordance with the sixth embodiment of the present invention.

Referring to FIG. 15, a brushless DC motor in accordance with the sixth embodiment of the present invention comprises a magnetic conductive tube 11, a pole plate 20 and a bobbin 31.

The magnetic conductive tube 11 is made of magnetizable material forming a pole plate 111 on one end, the pole plate 111 having poles 112, the outer edge of the poles 112 extending in an opposite direction than those of the other pole plate 21 so as to increase the induction area of the stator relative to the permanent magnet of a rotor, so that the thickness of a single plate of the pole plate 111 has a larger inductive area. The number of poles 112 are provided in accordance with the design requirement of the motor's pole number. An inner periphery of the magnetic conductive tube 11 is provided to contain a bearing (not shown) therein for extending through a shaft of the rotor, and an outer surface is provided to sleeve the pole plate 21 and the bobbin 30 thereon.

More than one pole plate 20 are sleeved to the outer surface of the magnetic conductive tube 10. It has poles 201 to interact with a permanent magnet of a rotor (not shown) so as to rotate the motor smoothly, and the number of poles 201 are provided in accordance with the design requirement of motor's the pole number.

The bobbin 31 is essentially made of insulation material such as plastic, and sleeved to the outer surface of the magnetic conductive tube 11. The bobbin 31 sleeves tightly or loosely to the outer surface of the magnetic conductive tube 11, and is positioned between the pole plate 111 and the pole plate 20, the coil 311 being wound on the bobbin 31. It is easy and convenient to wind the coil 311 on the bobbin 31 before or after the magnetic conductive tube 11 and the bobbin 31 are assembled. Either way may achieve the goal of easy assembly.

The sixth embodiment further discloses a positioning structure, comprises a plurality of holes 116, 202 respectively defined by the pole plates 111, 20 thereon. On two ends of the bobbin 31 are two discs 312 which limit the coil therebetween and insulate the coil form the plates 111, 20. And the two plates 312 have a plurality of posts 313 extending therefrom. The posts 313 fit into the holes 116, 202 so as to position easily and accurately the magnetic conductive tube 11 and the plate 111,20 on the bobbin 31. Because two discs 312 insulate the coil from the plates 111, 20, there is no need from provide an insulated layer which insulates the coil 301 to the plates 111, 20.

Figure 16:
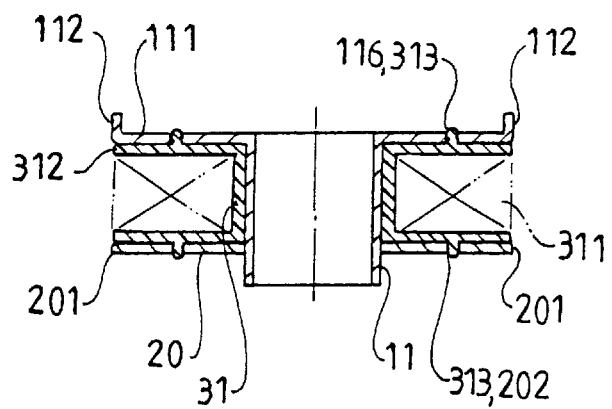
FIG. 16 is a sectional view of the brushless DC motor in accordance with the sixth embodiment of the present invention.

FIG. 16 shows the situation of the combination of the sixth embodiment of the present invention. The bobbin 31 is held between the pole plate 111 and the pole plate 20, and coil 311 is wound on the outer surface of bobbin 31, thus and forms a stator.

Figure 17:
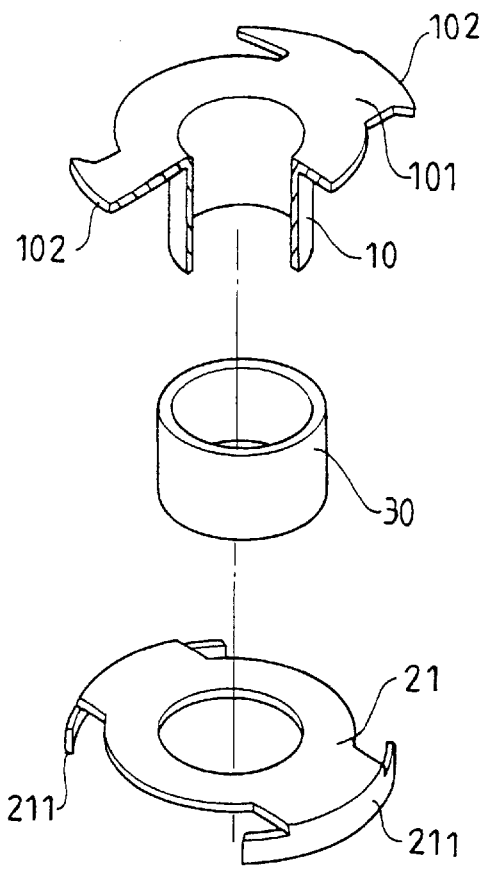
FIG. 17 is an exploded perspective view of a brushless DC motor in accordance with the seventh embodiment of the present invention.

Referring to FIG. 17, a brushless DC motor in accordance with the seventh embodiment of the present invention comprises a magnetic conductive tube 10, a pole plate 21 and a bobbin 30.

The magnetic conductive tube 10 is made of magnetizable material, forming a pole plate 101 on one end of the tube 10 so that the tube 10 and the pole plate 101 together form a body. The plate 101 forms poles 102. An inner periphery of the tube 10 is provided to contain a bearing (not shown) therein for extending through a shaft of the rotor, and an outer surface is provided to sleeve the pole plate 20 and the bobbin 30 thereon. The number of poles 102 are provided in accordance with the design requirement of the motor's pole number.

More than one pole plate 21 are sleeved on the outer surface of the magnetic conductive tube 11, the pole plate 21 having poles 211, the outer edge of the poles 211 extend in an opposite direction than of the other pole plate 11 so as to increase the induction area of the stator to the permanent magnet of a rotor, so that with the thickness of a single plate, the pole plate 111 has a larger induction area. The number of poles 112 are provided in accordance with the design requirement of the motor's pole number.

The bobbin 30 has been disclosed as above-mentioned, and the timing of winding the coil can be selected as required. Therefore the description here is not repeated here.

Figure 18:
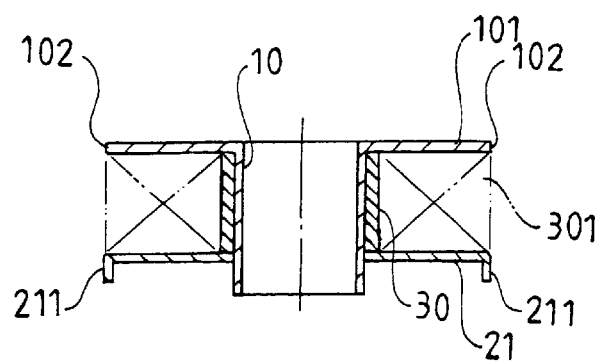
FIG. 18 is a sectional view of the brushless DC motor in accordance with the seventh embodiment of the present invention.

FIG. 18, that shows the situation of the combination of the seventh embodiment of the present invention. The bobbin 30 is held between the pole plate 101 and the pole plate 21, and coil 301 is wound on the outer surface of bobbin 30 An insulating layer is provided between the coil 301, pole plate 101 and the pole plate 21, thus forming a stator.

Figure 19:
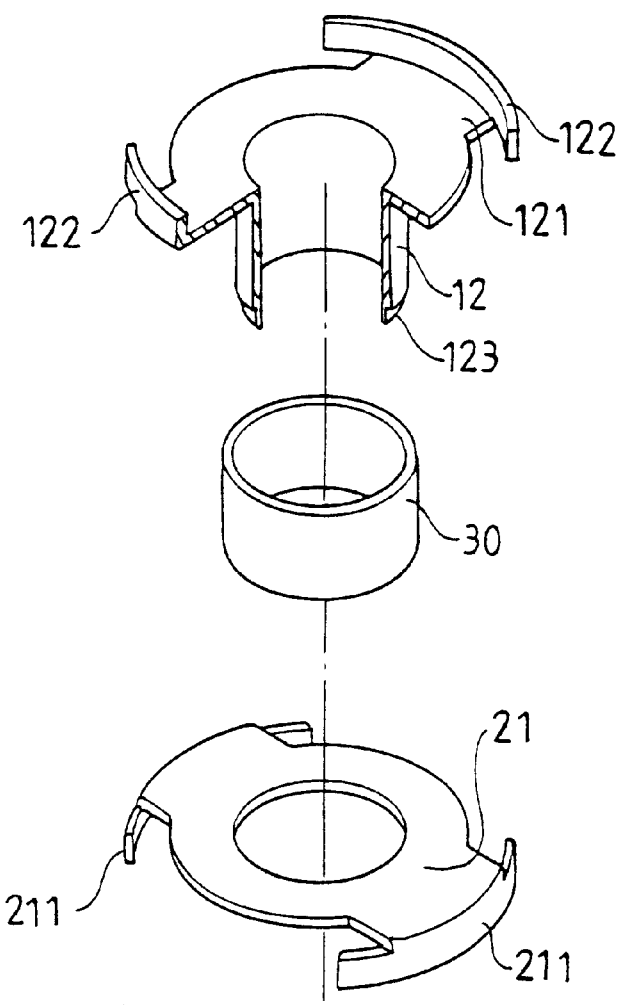
FIG. 19 is an exploded perspective view of a brushless DC motor in accordance with the eighth embodiment of the present invention.

Referring to FIG. 19, a brushless DC motor in accordance with the eighth embodiment of the present invention comprises a magnetic conductive tube 12, a plate 21 and a bobbin 30.

The magnetic conductive tube 12 is made of magnetizable material forming a pole plate 121 on one end, the pole plate 121 having poles 122, the outer edge of the poles 122 extending in an opposite direction than of the other pole plate 21 so as to increase the induction area of the stator to the permanent magnet of a rotor, so that with the thickness of a single plate, the pole plate 121 has a larger induction area. The number of poles 122 are provided in accordance with the design requirement of motor's pole number. An inner peripheral of the magnetic conductive tube 12 is provided to contain a bearing (not shown) therein for extending through a shaft of the rotor, and an outer surface is provided to sleeve the pole plate 21 and the bobbin 30 thereon. The end of the magnetic conductive tube 12 has provided thereon an annular flange 123 with a smaller diameter than the diameter of the pole plate 121. The annular flange 123 can be processed by bending press to fix the bobbin 30 in place.

The pole plate 21 and the bobbin 30 have been disclosed as above-mentioned, the timing of winding the coil can be selected as required.

Figure 20:
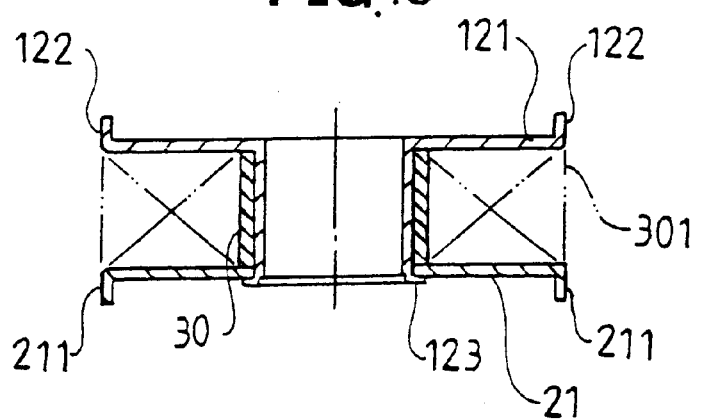
FIG. 20 is a sectional view of the brushless DC motor in accordance with the eighth embodiment of the present invention.

FIG. 20 shows the situation of the combination of the eighth embodiment of the present invention. The bobbin 30 is held between the pole plate 121 and the pole plate 21, an annular flange 123 is bent and positioned to insure that the pole plate 21 and the bobbin 30 are held in place, and coil 301 is wound on the outer surface of bobbin 30. An insulated layer provided between the coil 301, the pole plate 121 and the pole plate 21, thus forming a stator.

Figure 21:
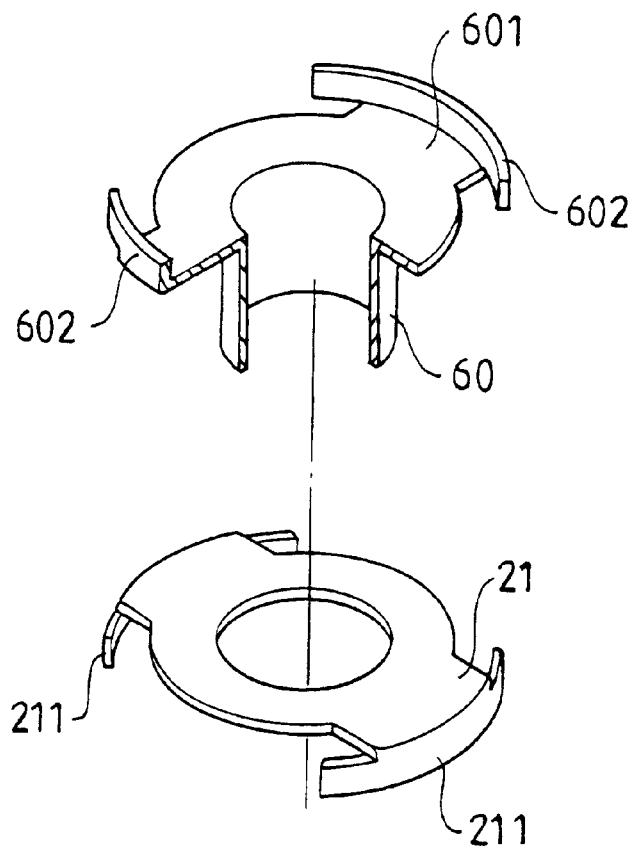
FIG. 21 is an exploded perspective view of a brushless DC motor in accordance with the ninth embodiment of the present invention.
Figure 22:
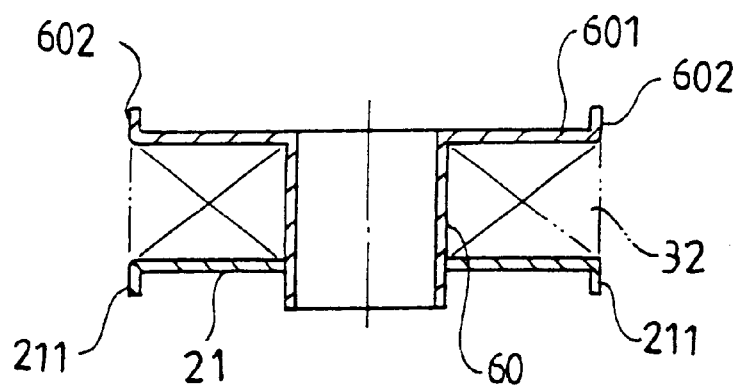
FIG. 22 is a sectional view of the brushless DC motor in accordance with the ninth embodiment of the present invention.

Referring to FIG. 21, a brushless DC motor in accordance with the ninth embodiment of the present invention comprises a pole plate 21 and a magnetic conductive tube 60.

The magnetic conductive tube 60 is made of magnetizable material forming a pole plate 601 on one end, the pole plate 601 having poles 602, the outer edge of the poles 602 extending in an opposite direction than the other pole plate 21 so as to increase the induction area of stator to the permanent magnet of a rotor, so that with the thickness of a single plate, the pole plate 601 has a larger induction area. The number of poles 602 are provided in accordance with the design requirement of the motor's pole number. An inner periphery of the magnetic conductive tube 60 is provided to contain a bearing (not shown) therein for extending through a shaft of the rotor. The contact surface between coil 32 and outer surface of magnetic conductive tube 60 and pole plate 601 need insulation treatment and forms an insulation layer. Therefore, the outer surface of magnetic conductive tube 60 provides pole plate 21 to sleeve onto and the coil 32 may be wound onto it.

The pole plate 21 is sleeved on the outer surface of the magnetic conductive tube 11, the pole plate 21 having poles 211, the outer edge of the poles 211 extending in an opposite opposite direction than the other pole plate 602 so as to increase the induction area of stator to the permanent magnet of a rotor, so that with the thickness of a single plate, the pole plate 21 has a larger induction area. The number of poles 211 are provided in accordance with the design requirement of the motor's pole number. The contact surface between the pole plate 21 and coil 32 needs insulation treatment to form an insulated layer.

Figure 23:
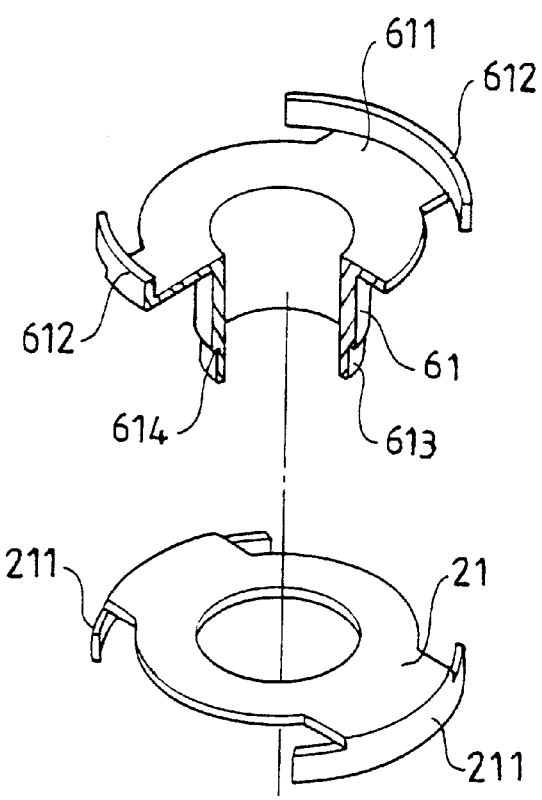
FIG. 23 is an exploded perspective view of a brushless DC motor in accordance with the tenth embodiment of the present invention.
Figure 24:
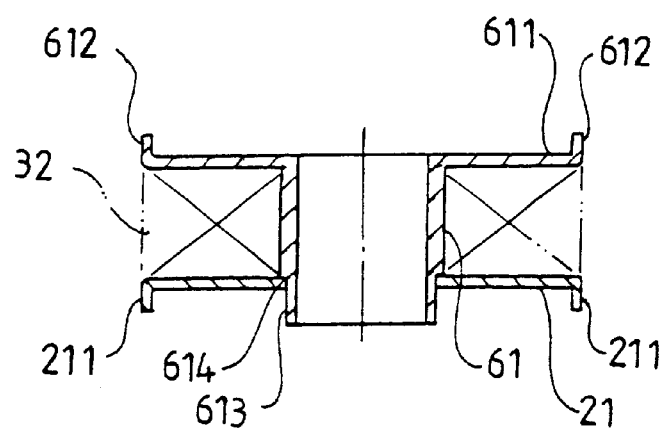
FIG. 24 is a sectional view of the brushless DC motor in accordance with the tenth embodiment of the present invention.

Referring to FIG. 23, a brushless DC motor in accordance with the tenth embodiment of the present invention comprises a pole plate 21 and a magnetic conductive tube 61 which is the same as the ninth embodiment. The contact surface between coil 32 and the pole plate 21 and pole plate 611 needs insulation treatment to form an insulated layer. The magnetic conductive tube 61 further comprises a smaller diameter at an end 613. A ladder-shaped corner 614 is formed by the different diameter on the outer surface of the magnetic conductive tube 61 for attaching and positioning the pole plate 21 (as shown in FIG. 24). A coil 32 may be wound on the outer surface of the magnetic conductive tube 61 at the section between the pole plate 611 and the pole plate 21, and thus it forms a stator.

Figure 25:
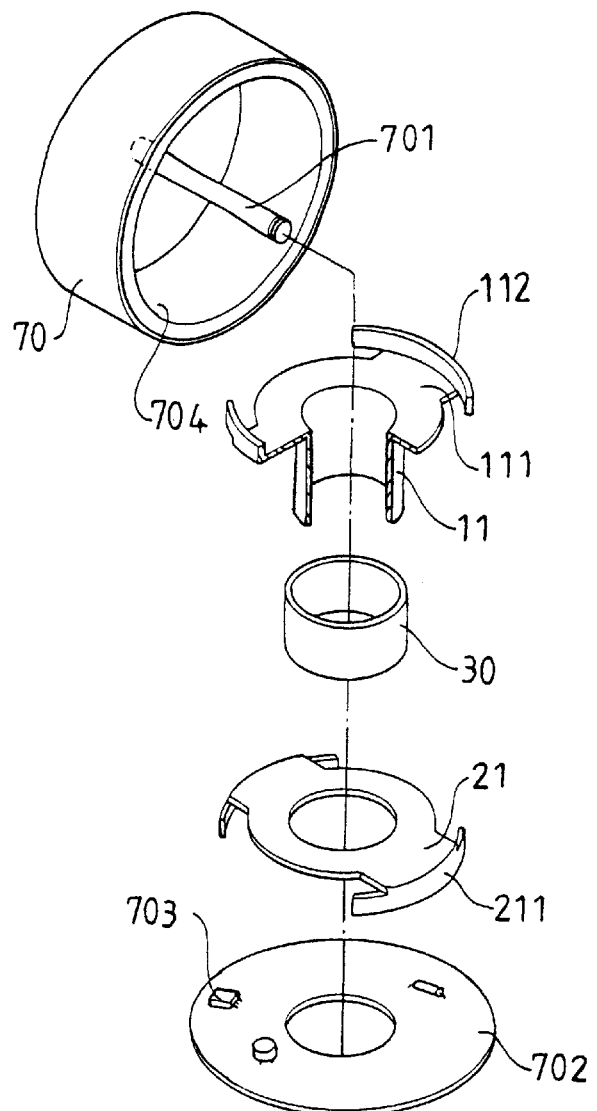
FIG. 25 is an exploded perspective view of the brushless DC motor in accordance with the second embodiment of the present invention.
Figure 26:
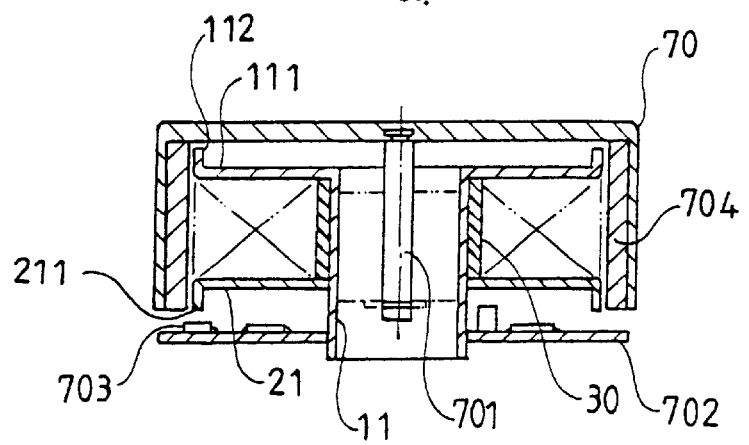
FIG. 26 is a sectional view of the brushless DC motor in accordance with the second embodiment of the present invention.

Referring to FIGS. 25 and 26, a rotor 70 and a circuit board 702 are assembled to form a motor corresponding to that of the second embodiment of the present invention. The second embodiment mainly comprises the magnetic conductive tube 11, the pole plate 21, the bobbin 30, a rotor 70 and a circuit board 702. The circuit board 702 mainly sleeves to the outer surface of the magnetic conductive tube 11 so as to allow a Hall IC 703 of the circuit board 702 to response to a permanent magnet 704 of the rotor 70. An inner periphery of the magnetic conductive tube 11 is provided to contain a bearing element therein for extending through a shaft 701 of the rotor 70 to form a brushless motor.

Figure 27:
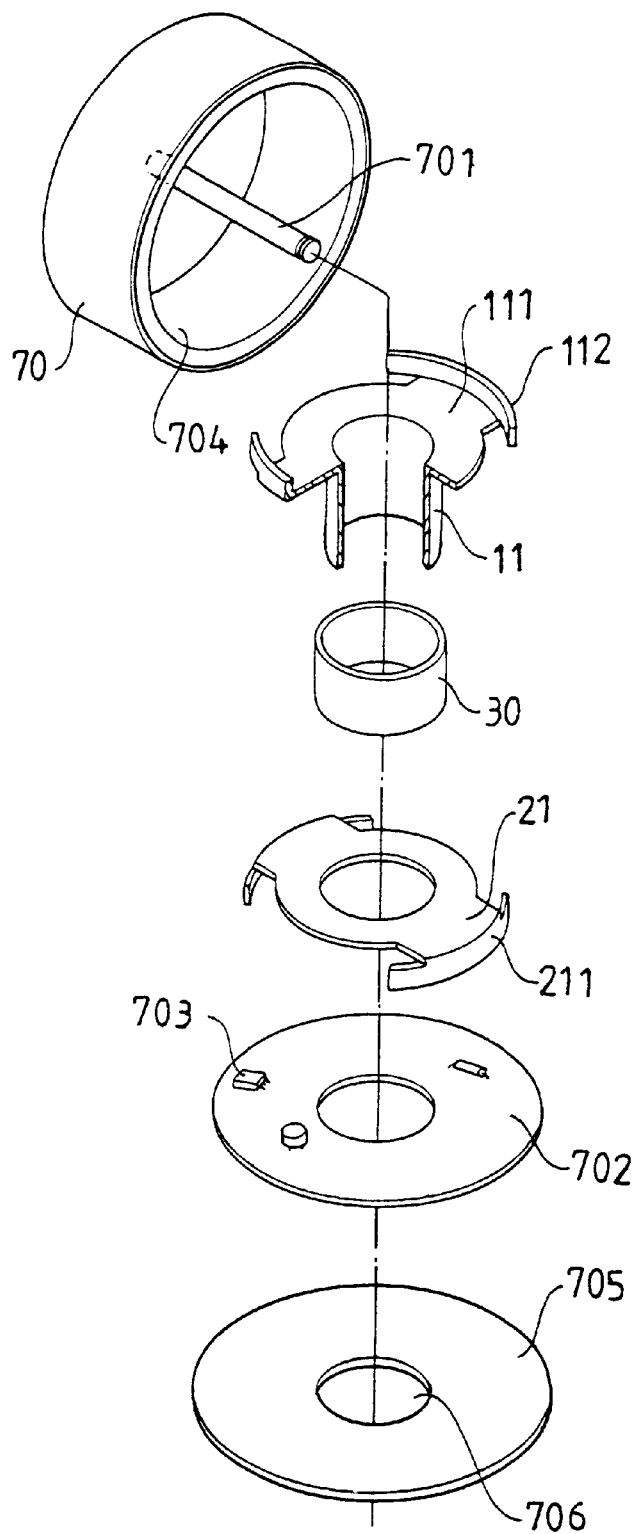
FIG. 27 is an exploded perspective view of the brushless DC motor in accordance with the second embodiment of the present invention with fixing member.

Referring to FIG. 27, a fixing member 705 is combined with the present invention. The fixing member 705 like a substrate or a case of an other product having a hole 706 through which to combine with the magnetic conductive tube 11 by means of an interference fit between different diameter, or by any other combination method.

Figure 28:
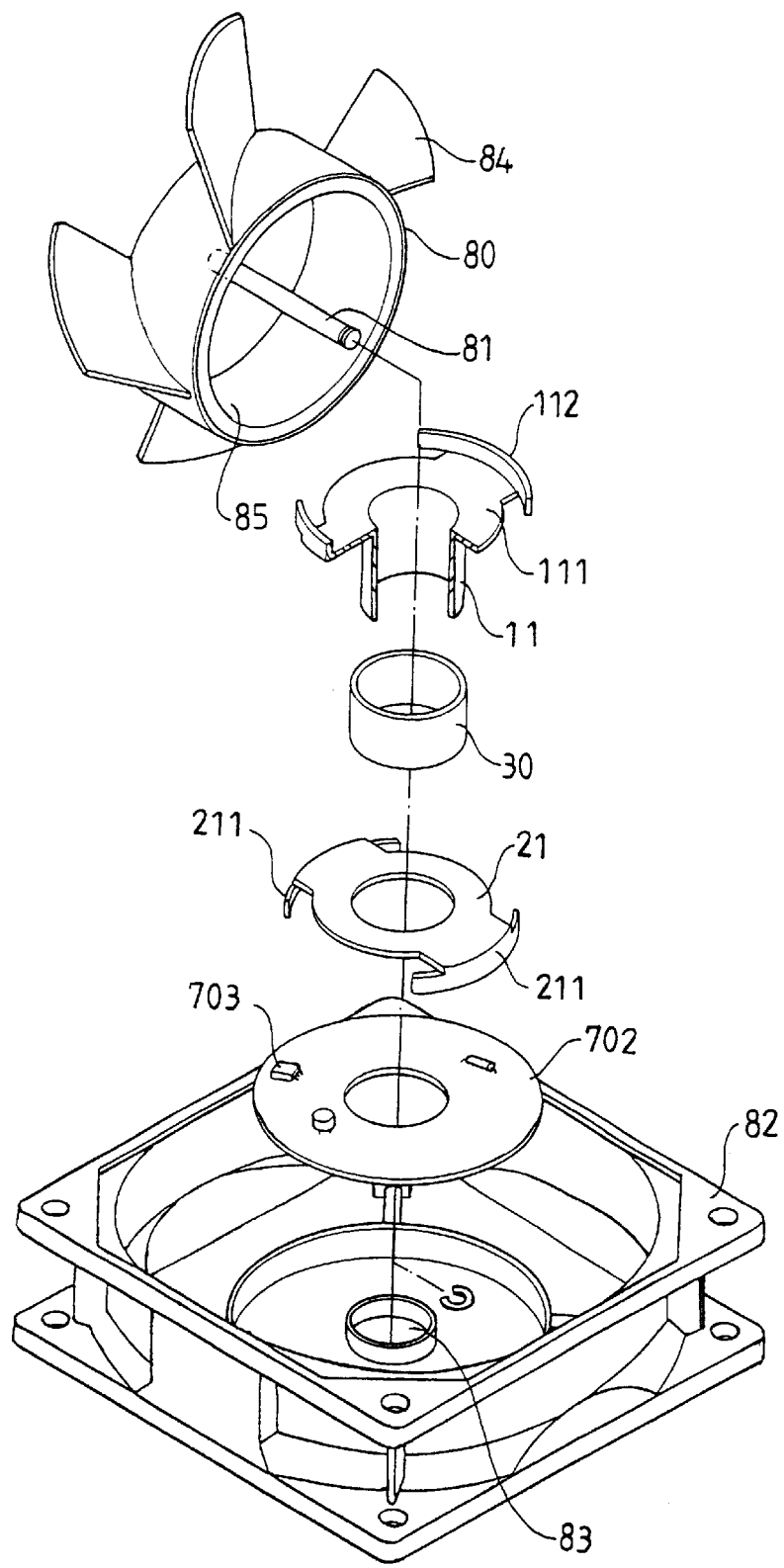
FIG. 28 is an exploded perspective view of the brushless DC motor in accordance with the second embodiment of the present invention with case
Figure 29:
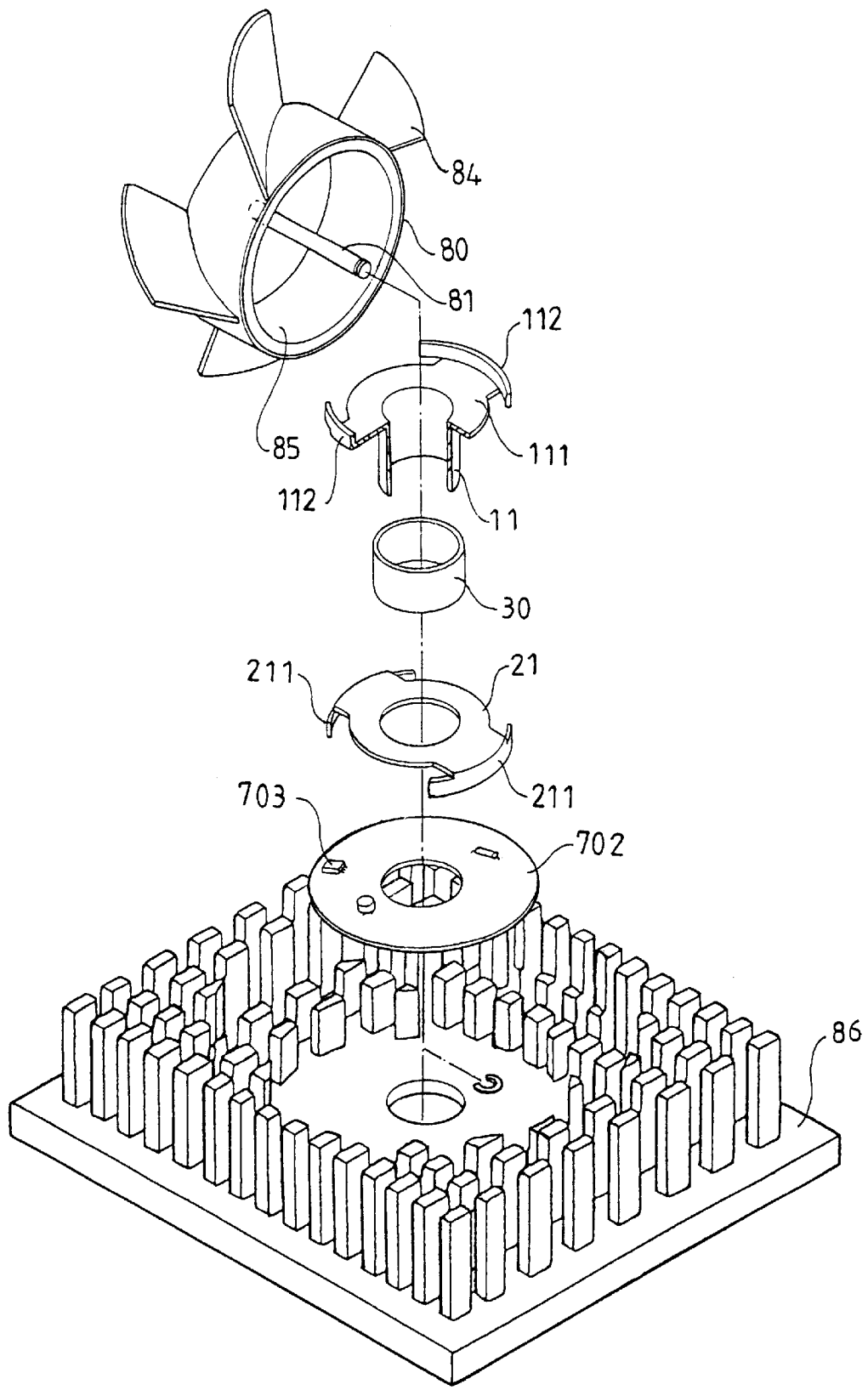
FIG. 29 is an exploded perspective view of the brushless DC motor in accordance with the second embodiment of the present invention with cooler device.

FIG. 28 shows the present invention brushless DC. motor (not labeled) and a case 82 combined together to form a cooler device which is consists of the magnetic conductive tube 11, the pole plate 21, the bobbin 30 and a circuit board 702. Then the magnetic conductive tube 11 is held in a hole 83 of the case 82 or a conventional heat sink 86 with fins or posts(as shown in FIG. 29). The inner peripheral of magnetic conductive tube 11 is provided to contain a bearing element (not shown) for extending through a shaft 81 of impeller 80. The impeller 80 further comprises a plurality of blades 84 and permanent magnets 85. Therefore, the combined cooler device may achieve the cooling results.

A brushless DC motor of the present invention as defined in claim 1 reduces the complexity and cost of manufacture of conventional metal tube and pole plate, and reduces the thickness of a stator by means of reducing the thickness of the annular flange protruded on the outside of the pole plate.

A brushless DC motor of the present invention as defined in claim 2, 9, 18, 24, 44 and 50 includes a magnetic conductive tube that reduces the complexity and cost of manufacture.

A brushless DC motor of the present invention as defined in claim 3, 10, 19, 25, 32, 37, 59, 63, 67, 71, 75, 79 includes a magnetic conductive tube on which a fixed member or a pole plate is mounted to hold the fixed member and the pole plate tightly.

A brushless DC motor of the present invention as defined in claim 4, 11, 20, 26, 33, 38 includes a magnetic conductive tube on which a pole plate is positioned to provide better positioning effect.

A brushless DC motor of the present invention as defined in claim 5, 12, 17 includes a larger area of the poles of a pole plate adjacent to the permanent magnet of the rotor. It has the same effect as an inducting area formed by a plurality of silicon steel plates. Further it may reduce the complexity of manufacturing and material cost of a plurality of silicon steel plates.

A brushless DC motor of the present invention as defined in claim 6, 7, 13, 14, 21, 22, 27, 28, 34, 35, 39, 40, 47, 48, 53, 54 includes a pole plate capable of forming an irregular magnetic field of the stator. Because of the irregular magnetic field, the stator drives the rotor easily at the start-up to avoid the dead point problem.

A brushless DC motor of the present invention as defined in claim 8, 23 reduces the complexity and cost of manufacture of conventional metal tube and pole plate, and reduces the thickness of a stator by means of reducing the thickness of the annular flange protruded on the outside of the pole plate. The present invention comprises a bobbin provides insulation between a coil and a magnetic conductive tube, and then a coil is wound to the bobbin after it is assembled or before it is assembled to the magnetic conductive tube according to need.

A brushless DC motor of the present invention as defined in claim 15, 29, 41, 55 includes a disc insulating the magnetic conductive tube to the coil, when coil is wound on the bobbin, the disc limits the coil in between the disc, thus result in better winding.

A brushless DC motor of the present invention as defined in claim 16, 30, 42, 56 includes a bobbin having a plurality of posts extending through a plurality of holes of two pole plates so that the two pole plates are capable of being positioned precisely and conveniently.

A brushless DC motor of the present invention as defined in claim 31 includes a pole plate extended to form poles with a larger inductive area than that of the plates adjacent to the permanent magnet of the rotor. Thus the overall height of the stator is not affected. It has the same effect of an inductive area formed by a plurality of silicon steel plates. And reduce the manufacturing and material cost.

A brushless DC motor of the present invention as defined in claim 36 includes a pole plate extended to form poles with larger inductive area than the plates adjacent to the permanent magnet of the rotor. Thus the overall height of the stator is not affected even though the magnetic conductive tube has an annular flange. It has the same effect as an inductive area formed by a plurality of silicon steel plates, and reduces the manufacturing and material cost. A coil is wound to the bobbin after or before it is assembled according to need. Either way may achieve the goal of easy assembly.

A brushless DC motor of the present invention as defined in claim 43 reduces the complexity and cost of manufacture of a conventional metal tube and pole plate, and reduces the thickness of the stator by means of reducing the thickness of the annular flange protruded on the outside of the pole plate. The present invention includes a larger area of the poles of a pole plate adjacent to the permanent magnet of the rotor. It has the same effect of an inducting area formed by a plurality of silicon steel plates. Further it may reduce the complexity of manufacturing and material cost of a plurality of silicon steel plates.

A brushless DC motor of the present invention as defined in claim 45, 46, 51, 52 includes a shaft of a supporter which combines the shaft and magnetic conductive tube so that the stator may be easily assembled.

A brushless DC motor of the present invention as defined in claim 49 reduces the complexity and cost of manufacture of conventional metal tube and upper pole plate, and reduces the thickness of a stator by means of reducing the thickness of the annular flange protruded above the upper pole plate. The present invention includes a larger inductive area of the poles of a pole plate adjacent to the permanent magnet of the rotor. It has the same effect of an inductive area formed by a plurality of silicon steel plates. Further it may reduce the complexity of manufacturing and material cost of a plurality of silicon steel plates. A coil is wound to the bobbin after or before it is assembled according to need. Either way may achieve the goal of easy assembly.

A brushless DC motor of the present invention as defined in claim 57, 61, 81, 82 reduces the complexity and the cost of manufacture, and the thickness of the motor.

A brushless DC motor of the present invention as defined in claim 58, 62, 66, 70, 74, 78 includes a fixed member to mount the motor in order to reduce the fixing element, the material and manufacturing cost.

A brushless DC motor of the present invention as defined in claim 60, 64, 68, 72, 76, 80 provides a better position result when the circuit board is assembled.

A brushless DC motor of the present invention as defined in claim 65, 69, 73, 77, 83, 84 reduces the complexity and the cost of manufacture, and the thickness of the motor. The present invention includes a larger inductive area of the poles of a pole plate adjacent to the permanent magnet an the rotor. It has the same effect of an inducting area formed by a plurality of silicon steel plates. Further it may reduce the complexity of manufacturing and material cost of a plurality of silicon steel plates.

A brushless DC motor of the present invention as defined in claim 85, 86, 87, 88 provides a heat-dissipating device and reduces the complexity and the cost of manufacture, and the thickness of the heat-dissipating device.

A brushless DC motor of the present invention as defined in claim 89 through 100 provides a heat-dissipating device and reduces the complexity and the cost of manufacture, and the thickness of the heat-dissipating device. The edge of the plate is extended to form a pole in order to increase the inductive area of the plates adjacent to the permanent magnet of the rotor so as to greatly reduce material cost.

A brushless DC motor of the present invention as defined in claim 101 through 108 provides a heat-dissipating device and reduces the complexity and the cost of manufacture. In addition, the frame is mounted to the heat sink at suitable position to form a heat-dissipating device.

The invention may have various modifications without departing from main spirit and novel features. Thus the preferred embodiment presented above are examples for explanation purpose not to limit the scope of the invention. The scope of this invention is covered by the patent claims appended, not by the detailed description of the preferred embodiment. Further more, any equivalent modification and variation of the claims also fall within the scope of the invention.

What is claimed is:

1. A stator comprising:
    a magnetic conductive tube made of magnetizable material and a first pole plate formed on one end of the magnetic conductive tube, the first pole plate further including a plurality of poles;
    a second pole plate, including a plurality of poles, said second pole plate being sleeved to the magnetic conductive tube and held on the magnetic conductive tube by means of a small diameter flange on the magnetic conductive tube; and
    a coil wound around the magnetic conductive tube and insulated with respect to the first and second pole plates.

2. The stator as defined in claim 1, wherein the magnetic conductive tube and a pole plate form a single member.

3. The stator as defined in claim 1, wherein one end of the magnetic conductive tube opposite said one end on which said first pole plate is formed is cylindrical and lacks an annular flange.

4. The stator as defined in claim 1, wherein one end of the magnetic conductive tube opposite said one end on which said first pole plate is formed includes an annular flange having a diameter smaller than a diameter of the first pole plate.

5. The stator as defined in claim 1, wherein at least one pole plate is extended in an opposite direction relative to another of the pole plates to define a larger inductive area.

6. The stator as defined in claim 1, wherein one of the pole plates has a recessed portion which forms an irregular magnetic field in order to let the stator drive the rotor easily during start-up.

7. The stator as defined in claim 1, wherein one of the pole plates has an inclined portion or a lower portion forming an irregular magnetic field in order to let the stator drive the rotor easily during start-up.

8. A stator comprising:
    a combined tube/plate member including a magnetic conductive tube made of magnetizable material and a first pole plate formed on one end of the magnetic conductive tube, the first pole plate further including a plurality of poles;
    a second pole plate, including a plurality of poles, said second pole plate being sleeved to the magnetic conductive tube and held on the magnetic conductive tube by means of a small diameter flange on the magnetic conductive tube; and
    a bobbin made of insulating material located between the second pole plate and the first pole plate, and insulated from the magnetic conductive tube and the first pole plate.

9. The stator as defined in claim 8, wherein the magnetic conductive tube and a pole plate form a single member.

10. The stator as defined in claim 8, wherein one end of the magnetic conductive tube opposite said one end on which said first pole plate is formed is cylindrical and lacks an annular flange.

11. The stator as defined in claim 8, wherein one end of the magnetic conductive tube opposite said one end on which said first pole plate is formed includes an annular flange having a diameter smaller than a diameter of the first pole plate.

12. The stator as defined in claim 8, wherein at least one pole plate is extended in an opposite direction relative to another of the pole plates to define a larger inductive area.

13. The stator as defined in claim 12, wherein the pole plate has a recessed portion which forms an irregular magnetic field in order to let the stator drive the rotor easily during start-up.

14. The stator as defined in claim 13, wherein the pole plate has an inclined portion or a lower smaller portion forming an irregular magnetic field in order to let the stator drive the rotor easily during start-up.

15. The stator as defined in claim 8, wherein the bobbin has two discs on two ends, a coil being wound in between the two discs.

16. The stator as defined in claim 15, wherein the discs further comprise a plurality of posts arranged to fit into a plurality of holes on the pole plates.

17. A stator comprising:
    a magnetic conductive tube made of magnetizable material and a first pole plate formed on one end of the magnetic conductive tube, the first pole plate further extending in an opposite direction relative to the tube to form a plurality of poles with enlarged inductive area;
    a second pole plate, including plurality of poles, said second pole plate being sleeved to the magnetic conductive tube, the second pole plate further extending in an opposite direction relative to the other pole plate to form a plurality of poles with enlarged inductive area; and a coil wound around the magnetic conductive tube and insulated with respect to the first and second pole plates.

18. The stator as defined in claim 17, wherein the magnetic conductive tube and a pole plate form a single member.

19. The stator as defined in claim 17, wherein one end of the magnetic conductive tube opposite said one end on which said first pole plate is formed is cylindrical and lacks an annular flange.

20. The stator as defined in claim 17, wherein one end of the magnetic conductive tube opposite said one end on which said first pole plate is formed includes an annular flange having a diameter smaller than a diameter of the first pole plate.

21. The stator as defined in claim 17, wherein one of the pole plates has a recessed portion which forms an irregular magnetic field in order to let the stator drive the rotor easily during start-up.

22. The stator as defined in claim 21, wherein one of the pole plates has an inclined portion or a lower portion forming an irregular magnetic field in order to let the stator drive the rotor easily during start-up.

23. A stator comprising:
a magnetic conductive tube made of magnetizable material and a first pole plate formed on one end of the magnetic conductive tube, the first pole plate further extending in an opposite direction relative to the tube to form a plurality of poles with enlarged inductive area;
a second pole plate, including plurality of poles, said second pole plate being sleeved to the magnetic conductive tube, the second pole plate further extending in an opposite direction relative to the other pole plate to form a plurality of poles with enlarged inductive area; and
a bobbin made of insulating material located between the second pole plate and the first pole plate, and insulated from the magnetic conductive tube and the first pole plate, a coil being wound around the bobbin and insulated from the two pole plates and the magnetic conductive tube.

24. The stator as defined in claim 23, wherein the magnetic conductive tube and a pole plate form a single member.

25. The stator as defined in claim 23, wherein one end of the magnetic conductive tube opposite said one end on which said first pole plate is formed is cylindrical and lacks an annular flange.

26. The stator as defined in claim 23, wherein one end of the magnetic conductive tube opposite said one end on which said first pole plate is formed includes an annular flange having a diameter smaller than a diameter of the first pole plate.

27. The stator as defined in claim 23, wherein the first pole plate has a recessed portion which forms an irregular magnetic field in order to let the stator drive the rotor easily during start-up.

28. The stator as defined in claim 27, wherein the first pole plate has an inclined portion or a lower portion forming an irregular magnetic field in order to let the stator drive the rotor easily during start-up.

29. The stator as defined in claim 23, wherein the bobbin has two discs on two ends, a coil being wound in between the two discs.

30. The stator as defined in claim 29, wherein the discs further comprise a plurality of posts arranged to fit into a plurality of holes on the pole plates.

31. A stator comprising:
a combined tube/plate member including a magnetic conductive tube made of magnetizable material and an annular flange formed on one end of the magnetic conductive tube;
a pole plate sleeved to the magnetic conductive tube adjacent to the annular flange, the pole plate further extending in an opposite direction relative to another pole plate to form a plurality of poles with enlarged inductive area; and
a coil wound around the magnetic conductive tube and insulated with respect to the pole plates and the magnetic conductive tube.

32. The stator as defined in claim 31, wherein one end of the magnetic conductive tube is cylindrical and lacks an annular flange.

33. The stator as defined in claim 31, wherein one end of the magnetic conductive tube includes an annular flange having a diameter smaller than a diameter of said pole plate.

34. The stator as defined in claim 31, wherein the pole plate has a recessed portion which forms an irregular magnetic field in order to let the stator drive the rotor easily during start-up.

35. The stator as defined in claim 34, wherein the pole plate has an inclined portion or a lower portion forming an irregular magnetic field in order to let the stator drive the rotor easily during start-up.

36. A stator comprising:
a combined tube/plate member including a magnetic conductive tube made of magnetizable material and an annular flange formed on one end of the magnetic conductive tube;
a pole plate sleeved to the magnetic conductive tube adjacent to the annular flange, the pole plate further extending in an opposite direction relative to another pole plate to form a plurality of poles with enlarged inductive area; and
a bobbin made of insulating material located between the second pole plate and the first pole plate, and insulated from the magnetic conductive tube and the first pole plate, a coil being wound around the bobbin and insulated from the two pole plates and the magnetic conductive tube.

37. The stator as defined in claim 36, wherein one end of the magnetic conductive tube is cylindrical and lacks an annular flange.

38. The stator as defined in claim 36, wherein one end of the magnetic conductive tube includes an annular flange having a diameter smaller than a diameter of the first pole plate.

39. The stator as defined in claim 36, wherein the pole plate has a recessed portion which forms an irregular magnetic field in order to let the stator drive the rotor easily during start-up.

40. The stator as defined in claim 36, wherein the pole plate has an inclined portion or a lower portion forming an irregular magnetic field in order to let the stator drive the rotor easily during start-up.

41. The stator as defined in claim 36, wherein the bobbin has two discs on two ends, a coil being wound in between the two discs.

42. The stator as defined in claim 41, wherein the discs further comprise a plurality of posts arranged to fit into a plurality of holes on the pole plates.

43. A stator comprising:
first and second magnetic conductive tubes made of a magnetizable material, and at least one pole plate formed on one end of one of the magnetic conductive tubes to form a combined tube/plate member, the pole plate further extending in an opposite direction relative to another pole plate to form a plurality of poles with enlarged inductive area; and a coil wound around the magnetic conductive tube and insulated with respect to the first and second pole plates.

44. The stator as defined in claim 43, wherein the magnetic conductive tube and a pole plate form a single member.

45. The stator as defined in claim 43 wherein said second magnetic conductive tube has a same diameter as the first said magnetic conductive tube, two ends of the second magnetic conductive tube being attached to each other to form an inner peripheral for containing a bearing adapted to be fixed on a support element.

46. The stator as defined in claim 43 wherein said second magnetic conductive tube has a different diameter than the first said magnetic conductive tube, two ends of the second magnetic conductive tube being sleeved together, a smaller of the two tubes being held in the larger of the two tubes and adapted to be fixed on a support element.

47. The stator as defined in claim 43, wherein the pole plate has a recessed portion which forms an irregular magnetic field in order to let the stator drive the rotor easily during start-up.

48. The stator as defined in claim 43, wherein the pole plate has an inclined portion or a lower portion forming an irregular magnetic field in order to let the stator drive the rotor easily during start-up.

49. A stator comprising:

first and second magnetic conductive tubes made of magnetizable material, and a first pole plate formed on one end of the first magnetic conductive tube to form a combined tube/plate member, the first pole plate further extending in an opposite direction relative to the second pole plate to form a plurality of poles with enlarged inductive area;

a bobbin made of insulating material located between the second pole plate and the first pole plate, and insulated from the magnetic conductive tube and the first pole plate, a coil being wound around the bobbin and insulated from the two pole plates and the magnetic conductive tube.

50. The stator as defined in claim 49, wherein the magnetic conductive tube and a pole plate form a single member.

51. The stator as defined in claim 49 wherein said second magnetic conductive tube has a same diameter as the first said magnetic conductive tube, two ends of the second magnetic conductive tube being attached to each other to form an inner peripheral for containing a bearing adapted to be fixed on a support element.

52. The stator as defined in claim 49 wherein said second magnetic conductive tube has a different diameter than the first said magnetic conductive tube two ends of the second magnetic conductive tube being sleeved together, a smaller of the two tubes being held in the larger of the two tubes and adapted to be fixed on a support element.

53. The stator as defined in claim 49, wherein the pole plate has a recessed portion which forms an irregular magnetic field in order to let the stator drive the rotor easily during start-up.

54. The stator as defined in claim 49, wherein the pole plate has an inclined portion or a lower portion forming an irregular magnetic field in order to let the stator drive the rotor easily during start-up.

55. The stator as defined in claim 49, wherein the bobbin has two discs on two ends, a coil being wound in between the two discs.

56. The stator as defined in claim 55, wherein the discs further comprise a plurality of posts arranged to fit into a plurality of holes on the pole plates.

57. A motor comprising:

a magnetic conductive tube made of magnetizable material and a first pole plate formed on one end of the magnetic conductive tube, the first pole plate further including a plurality of poles;

a second pole plate, including a plurality of poles, said second pole plate being sleeved to the magnetic conductive tube and held on the magnetic conductive tube by means of a small diameter flange on the magnetic conductive tube;

a coil wound around the magnetic conductive tube and insulated with respect to the first and second pole plates and the magnetic conductive tube;

a rotor having a ring-shaped permanent magnet and a shaft extending through the magnetic conductive tube; and a circuit board having a Hall IC and control elements for controlling rotation of the rotor.

58. The motor as defined in claim 57, wherein an end of the magnetic conductive tube without a pole plate engages a fixed member.

59. The motor as defined in claim 57 or 58, wherein one end of the magnetic conductive tube opposite said one end on which said first pole plate is formed is cylindrical and lacks an annular flange.

60. The motor as defined in claim 57 or 58, wherein one end of the magnetic conductive tube opposite said one end on which said first pole plate is formed includes an annular flange having a diameter smaller than a diameter of the first pole plate.

61. A motor comprising:

a magnetic conductive tube made of magnetizable material and a first pole plate formed on one end of the magnetic conductive tube, the first pole plate further including a plurality of poles;

a second pole plate, including a plurality of poles, said second pole plate being sleeved to the magnetic conductive tube and held on the magnetic conductive tube by means of a small diameter flange on the magnetic conductive tube;

a bobbin made of insulating material located between the second pole plate and the first pole plate, and insulated from the magnetic conductive tube and the first pole plate;

a coil wound around the bobbin and insulated from the two pole plates and the magnetic conductive tube;

a rotor having a ring-shaped permanent magnet and a shaft extending through the magnetic conductive tube; and a circuit board having a Hall IC and control elements for controlling rotation of the rotor.

62. The motor as defined in claim 61, wherein an end of the magnetic conductive tube without a pole plate engages a fixed member.

63. The motor as defined in claim 61 or 62, wherein one end of the magnetic conductive tube opposite said one end on which said first pole plate is formed is cylindrical and lacks an annular flange.

64. The motor as defined in claim 61 or 62, wherein one end of the magnetic conductive tube opposite said one end on which said first pole plate is formed includes an annular flange having a diameter smaller than a diameter of the first pole plate.

65. A motor comprising:
- a combined tube/plate member including a magnetic conductive tube made of magnetizable material and a first pole plate formed on one end of the magnetic conductive tube, the first pole plate further extending in an opposite direction relative to the tube to form a plurality of poles with enlarged inductive area;
- a second pole plate, including plurality of poles, said second pole plate being sleeved to the magnetic conductive tube, the second pole plate further extending in an opposite direction relative to the other pole plate to form a plurality of poles with enlarged inductive area;
- a coil wound around the magnetic conductive tube between the two pole plates and insulated with respect to the two pole plates and the magnetic conductive tube;
- a rotor having a ring-shaped permanent magnet and a shaft extending through the magnetic conductive tube; and
- a circuit board having a Hall IC and control elements for controlling rotation of the rotor.

66. The motor as defined in claim 65, wherein an end of the magnetic conductive tube without a pole plate engages a fixed member.

67. The motor as defined in claim 65 or 66, wherein one end of the magnetic conductive tube without a pole plate has an annular flange having a diameter smaller than a diameter of said first pole plate.

68. The motor as defined in claim 65 or 66, wherein one end of the magnetic conductive tube opposite said one end on which said first pole plate is formed includes an annular flange having a diameter smaller than a diameter of the first pole plate.

69. A heat dissipating device comprising:
- a combined tube/plate member including a magnetic conductive tube made of magnetizable material and a first pole plate formed on one end of the magnetic conductive tube, the first pole plate further extending in an opposite direction relative to the tube to form a plurality of poles with enlarged inductive area;
- a second pole plate, including plurality of poles, said second pole plate being sleeved to the magnetic conductive tube, the second pole plate further extending in an opposite direction relative to the other pole plate to form a plurality of poles with enlarged inductive area;
- a coil wound around the magnetic conductive tube between the two pole plates and insulated with respect to the two pole plates and the magnetic conductive tube;
- a fan having a plurality of blades and a shaft which rotates inside the magnetic conductive tube, the fan further having a ring-shaped permanent magnet;
- a circuit board having a Hall IC and control elements for controlling rotation of the fan; and
- a heat dissipating member having a hole which holds the magnetic conductive tube.

70. The motor as defined in claim 69, wherein an end of the magnetic conductive tube without a pole plate engages a fixed member.

71. The motor as defined in claim 69 or 70, wherein one end of the magnetic conductive tube without a pole plate has an annular flange having a diameter smaller than a diameter of said first pole plate.

72. The motor as defined in claim 69 or 70, wherein one end of the magnetic conductive tube opposite said one end on which said first pole plate is formed includes an annular flange having a diameter smaller than a diameter of the first pole plate.

73. A motor comprising:
- a combined tube/plate member including a magnetic conductive tube made of magnetizable material and an annular flange formed on one end of the magnetic conductive tube;
- a pole plate sleeved to the magnetic conductive tube adjacent to the annular flange, the pole plate further extending in an opposite direction relative to another pole plate to form a plurality of poles with enlarged inductive area;
- a coil wound around the magnetic conductive tube and insulated with respect to the pole plates and the magnetic conductive tube;
- a rotor having a ring-shaped permanent magnet and a shaft extending through the magnetic conductive tube; and
- a circuit board having a Hall IC and control elements for controlling rotation of the rotor.

74. The motor as defined in claim 73, wherein an end of the magnetic conductive tube without a pole plate engages a fixed member.

75. The motor as defined in claim 73 or 74, wherein one end of the magnetic conductive tube without a pole plate has an annular flange having a diameter smaller than a diameter of said first pole slate.

76. The motor as defined in claim 73 or 74, wherein one end of the magnetic conductive tube opposite said one end on which said first pole plate is formed includes an annular flange having a diameter smaller than a diameter of the first pole plate.

77. A motor comprising:
- a combined tube/plate member including a magnetic conductive tube made of magnetizable material and an annular flange formed on one end of the magnetic conductive tube;
- a pole plate sleeved to the magnetic conductive tube adjacent to the annular flange, the pole plate further extending in an opposite direction relative to another pole plate to form a plurality of poles with enlarged inductive area; and
- a bobbin made of insulating material located between the second pole plate and the first pole plate, and insulated from the magnetic conductive tube and the first pole plate, a coil being wound around the bobbin and insulated from the two pole plates and the magnetic conductive tube;
- a rotor having a ring-shaped permanent magnet and a shaft extending through the magnetic conductive tube; and
- a circuit board having a Hall IC and control elements for controlling rotation of the rotor.

78. The motor as defined in claim 77, wherein an end of the magnetic conductive tube without a pole plate engages a fixed member.

79. The motor as defined in claim 77 or 78, wherein one end of the magnetic conductive tube without a pole plate has an annular flange having a diameter smaller than a diameter of said first pole plate.

80. The motor as defined in claim 77 or 78, wherein one end of the magnetic conductive tube opposite said one end on which said first pole plate is formed includes an annular flange having a diameter smaller than a diameter of the first pole plate.

81. A motor comprising:
first and second magnetic conductive tubes made of a magnetizable material, and at least one pole plate formed on one end of one of the magnetic conductive tubes to form a combined tube/plate member, the pole plate further extending in an opposite direction relative to another pole plate to form a plurality of poles with enlarged inductive area; and
a coil wound around the magnetic conductive tube and insulated with respect to the first and second pole slates and the magnetic conductive tube;
a rotor having a ring-shaped permanent magnet and a shaft extending through one of the magnetic conductive tubes; and
a circuit board having a Hall IC and control elements for controlling rotation of the rotor.

82. The motor as defined in claim 81, wherein respective interiors of the two magnetic conductive tubes are connected by a tube-shaped support element which holds the shaft of the rotor.

83. A motor comprising:
first and second magnetic conductive tubes made of magnetizable material, and a first pole plate formed on one end of the first magnetic conductive tube to form a combined tube/plate member, the first pole plate further extending in an opposite direction relative to the second pole plate to form a plurality of poles with enlarged inductive area;
a bobbin made of insulating material located between the second pole plate and the first pole plate, and insulated from the magnetic conductive tube and the first pole plate, a coil being wound around the bobbin and insulated from the two pole plates and the magnetic conductive tube;
a rotor having a ring-shaped permanent magnet and a shaft extending through one of the magnetic conductive tubes; and
a circuit board having a Hall IC and control elements for controlling rotation of the rotor.

84. The motor as defined in claim 83, wherein respective interiors of the two magnetic conductive tubes are connected by a tube-shaped support element which holds the shaft of the rotor.

85. A heat dissipating device comprising:
a combined tube/plate member including a magnetic conductive tube made of magnetizable material and a first pole plate formed on one end of the magnetic conductive tube, the first pole plate further including a plurality of poles;
a second pole plate, including a plurality of poles, said second pole plate being sleeved to the magnetic conductive tube and held on the magnetic conductive tube by means of a small diameter flange on the magnetic conductive tube;
a coil wound around the magnetic conductive tube and insulated with respect to the first and second pole plates and the magnetic conductive tube;
a fan having a plurality of blades and a shaft which rotates inside the magnetic conductive tube, the fan further having a ring-shaped permanent magnet;
a circuit board having a Hall IC and control elements for controlling rotation of the fan; and
a heat dissipating member having a hole which holds the magnetic conductive tube.

86. The heat dissipating device as defined in claim 85, wherein the heat dissipating member includes a plurality of heat dissipating fins or heat dissipating posts.

87. A heat dissipating device comprising:
a combined tube/plate member including a magnetic conductive tube made of magnetizable material and a first pole plate formed on one end of the magnetic conductive tube, the first pole plate further including a plurality of poles;
a second pole plate, including a plurality of poles, said second pole plate being sleeved to the magnetic conductive tube and held on the magnetic conductive tube by means of a small diameter flange on the magnetic conductive tube;
a bobbin made of insulating material located between the second pole plate and the first pole plate, and insulated from the magnetic conductive tube and the first pole plate;
a coil wound around the bobbin and insulated from the two pole plates and the magnetic conductive tube;
a fan having a plurality of blades and a shaft which rotates inside the magnetic conductive tube, the fan further having a ring-shaped permanent magnet;
a circuit board having a Hall IC and control elements for controlling rotation of the fan; and
a heat dissipating member having a hole which holds the magnetic conductive tube.

88. The heat dissipating device as defined in claim 87, wherein the heat dissipating member includes a plurality of heat dissipating fins or heat dissipating posts.

89. A heat dissipating device comprising:
a combined tube/plate member including a magnetic conductive tube made of magnetizable material and a first pole plate formed on one end of the magnetic conductive tube, the first pole plate further extending in an opposite direction relative to the tube to form a plurality of poles with enlarged inductive area;
a second pole plate, including plurality of poles, said second pole plate being sleeved to the magnetic conductive tube, the second pole plate further extending in an opposite direction relative to the other pole plate to form a plurality of poles with enlarged inductive area;
a coil wound around the magnetic conductive tube between the two pole plates and insulated with respect to the two pole plates and the magnetic conductive tube;
a fan having a plurality of blades and a shaft which rotates inside the magnetic conductive tube, the fan further having a ring-shaped permanent magnet;
a circuit board having a Hall IC and control elements for controlling rotation of the fan; and
a heat dissipating member having a hole which holds the magnetic conductive tube.

90. The heat dissipating device as defined in claim 89, wherein the heat dissipating member includes a plurality of heat dissipating fins or heat dissipating posts.

91. A heat dissipating device comprising:
a combined tube/plate member including a magnetic conductive tube made of magnetizable material and a first pole plate formed on one end of the magnetic conductive tube, the first pole plate further extending in an opposite direction relative to the tube to form a plurality of poles with enlarged inductive area;
a second pole plate, including plurality of poles, said second pole plate being sleeved to the magnetic conductive tube, the second pole plate further extending in an opposite direction relative to the other pole plate to form a plurality of poles with enlarged inductive area;

a bobbin made of insulating material located between the second pole plate and the first pole plate, and insulated from the magnetic conductive tube and the first pole plate, a coil being wound around the bobbin and insulated from the two pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a heat dissipating member having a hole which holds the magnetic conductive tube.

92. The heat dissipating device as defined in claim 91, wherein the heat dissipating member includes a plurality of heat dissipating fins or heat dissipating posts.

93. A heat dissipating device comprising:

a combined tube/plate member including a magnetic conductive tube made of magnetizable material and an annular flange formed on one end of the magnetic conductive tube;

a pole plate sleeved to the magnetic conductive tube adjacent to the annular flange, the pole plate further extending in an opposite direction relative to another pole plate to form a plurality of poles with enlarged inductive area;

a coil wound around the magnetic conductive tube and insulated with respect to the pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a heat dissipating member having a hole which holds the magnetic conductive tube.

94. The heat dissipating device as defined in claim 93, wherein the heat dissipating member includes a plurality of heat dissipating fins or heat dissipating posts.

95. A heat dissipating device comprising:

a combined tube/plate member including a magnetic conductive tube made of magnetizable material and an annular flange formed on one end of the magnetic conductive tube;

a pole plate sleeved to the magnetic conductive tube adjacent to the annular flange, the pole plate further extending in an opposite direction relative to another pole plate to form a plurality of poles with enlarged inductive area; and a bobbin made of insulating material located between the second pole plate and the first pole plate, and insulated from the magnetic conductive tube and the first pole plate, a coil being wound around the bobbin and insulated from the two pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a heat dissipating member having a hole which holds the magnetic conductive tube.

96. The heat dissipating device as defined in claim 95, wherein the heat dissipating member includes a plurality of heat dissipating fins or heat dissipating posts.

97. A heat dissipating device comprising:

first and second magnetic conductive tubes made of magnetizable material, and a first pole plate formed on one end of the first magnetic conductive tube to form a combined tube/plate member, the first pole plate further extending in an opposite direction relative to the second pole plate to form a plurality of poles with enlarged inductive area; respective interiors of the two magnetic conductive tubes are connected by a tube-shaped support element;

a coil wound around the magnetic conductive tube and insulated with respect to the first and second pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a heat dissipating member having a hole which holds the magnetic conductive tube.

98. The heat dissipating device as defined in claim 97, wherein the heat dissipating member includes a plurality of heat dissipating fins or heat dissipating posts.

99. A heat dissipating device comprising:

first and second magnetic conductive tubes made of magnetizable material, and a first pole plate formed on one end of the first magnetic conductive tube to form a combined tube/plate member, the first pole plate further extending in an opposite direction relative to the second pole plate to form a plurality of poles with enlarged inductive area; respective interiors of the two magnetic conductive tubes are connected by a tube-shaped support element;

a bobbin made of insulating material located between the second pole plate and the first pole plate, and insulated from the magnetic conductive tube and the first pole plate, a coil being wound around the bobbin and insulated from the two pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a heat dissipating member having a hole which holds the magnetic conductive tube.

100. The heat dissipating device as defined in claim 99, wherein the heat dissipating member includes a plurality of heat dissipating fins or heat dissipating posts.

101. A heat dissipating device comprising:

a combined tube/plate member including a magnetic conductive tube made of magnetizable material and a first pole plate formed on one end of the magnetic conductive tube, the first pole plate further including a plurality of poles;

a second pole plate, including a plurality of poles, said second pole plate being sleeved to the magnetic conductive tube and held on the magnetic conductive tube by means of a small diameter flange on the magnetic conductive tube;

a coil wound around the magnetic conductive tube and insulated with respect to the first and second pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a case which holds the magnetic conductive tube.

102. A heat dissipating device comprising:

a combined tube/plate member including a magnetic conductive tube made of magnetizable material and a first pole plate formed on one end of the magnetic conductive tube, the first pole plate further including a plurality of poles;

a second pole plate, including a plurality of poles, said second pole plate being sleeved to the magnetic conductive tube and held on the magnetic conductive tube by means of a small diameter flange on the magnetic conductive tube;

a bobbin made of insulating material located between the second pole plate and the first pole plate, and insulated from the magnetic conductive tube and the first pole plate;

a coil wound around the bobbin and insulated from the two pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a case which holds the magnetic conductive tube.

103. A heat dissipating device comprising:

a combined tube/plate member including a magnetic conductive tube made of magnetizable material and a first pole plate formed on one end of the magnetic conductive tube, the first pole plate farther extending in an opposite direction relative to the tube to form a plurality of poles with enlarged inductive area;

a second pole plate, including a plurality of poles, said second pole plate being sleeved to the magnetic conductive tube, the second pole plate further extending in an opposite direction relative to the other pole plate to form a plurality of poles with enlarged inductive area; and a coil wound around the magnetic conductive tube between the two pole plates and insulated with respect to the two pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a case which holds the magnetic conductive tube.

104. A heat dissipating device comprising:

a combined tube/plate member including a magnetic conductive tube made of magnetizable material and a first pole plate formed on one end of the magnetic conductive tube, the first pole plate further extending in an opposite direction relative to the tube to form a plurality of poles with enlarged inductive area;

a second pole plate, including plurality of poles, said second pole plate being sleeved to the magnetic conductive tube, the second pole plate further extending in an opposite direction relative to the other pole plate to form a plurality of poles with enlarged inductive area;

a bobbin made of insulating material located between the second pole plate and the first pole plate, and insulated from the magnetic conductive tube and the first pole plate, a coil being wound around the bobbin and insulated from the two pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a case which holds the magnetic conductive tube.

105. A heat dissipating device comprising:

a combined tube/flange member including a magnetic conductive tube made of magnetizable material and an annular flange formed on one end of the magnetic conductive tube;

a pole plate sleeved to the magnetic conductive tube adjacent to the annular flange, the pole plate further extending in an opposite direction relative to another pole plate to form a plurality of poles with enlarged inductive area;

a coil wound around the magnetic conductive tube and insulated with respect to the pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a case which holds the magnetic conductive tube.

106. A heat dissipating device comprising:

a combined tube/flange member including a magnetic conductive tube made of magnetizable material and an annular flange formed on one end of the magnetic conductive tube;

a pole plate sleeved to the magnetic conductive tube adjacent to the annular flange, the pole plate further extending in an opposite direction relative to another pole plate to form a plurality of poles with enlarged inductive area; and a bobbin made of insulating material located between the second pole plate and the first pole plate, and insulated from the magnetic conductive tube and the first pole plate, a coil being wound around the bobbin and insulated from the two pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a case which holds the magnetic conductive tube.

107. A heat dissipating device comprising:

first and second magnetic conductive tubes made of magnetizable material, and a first pole plate formed on one end of the first magnetic conductive tube to form a combined tube/-plate member, the first pole plate further extending in an opposite direction relative to the second pole plate to form a plurality of poles with enlarged inductive area; respective interiors of the two magnetic conductive tubes are connected by a tube-shaped support element;

a coil wound around the magnetic conductive tube and insulated with respect to the first and second pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a case which holds the magnetic conductive tube.

108. A heat dissipating device comprising:

first and second magnetic conductive tubes made of magnetizable material, and a first pole plate formed on one end of the first magnetic conductive tube to form a combined tube/plate member, the first pole plate further extending in an opposite direction relative to the second pole plate to form a plurality of poles with enlarged inductive area; respective interiors of the two magnetic conductive tubes are connected by a tube-shaped support element;

a bobbin made of insulating material located between the second pole plate and the first pole plate, and insulated from the magnetic conductive tube and the first pole plate, a coil being wound around the bobbin and insulated from the two pole plates and the magnetic conductive tube;

a fan having a plurality of blades and a shaft which rotates inside the magnetic conductive tube, the fan further having a ring-shaped permanent magnet;

a circuit board having a Hall IC and control elements for controlling rotation of the fan; and a case which holds the magnetic conductive tube.

* * * * *